US011973532B2

(12) United States Patent
Chen et al.

(10) Patent No.: US 11,973,532 B2
(45) Date of Patent: Apr. 30, 2024

(54) CO-CABLE PROBABILITY DETECTION METHOD AND APPARATUS

(71) Applicant: Huawei Technologies Co., Ltd., Shenzhen (CN)

(72) Inventors: Yixiao Chen, Ottawa (CA); Minghui Fan, Dongguan (CN); Chuan Li, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 70 days.

(21) Appl. No.: 17/940,269

(22) Filed: Sep. 8, 2022

(65) Prior Publication Data

US 2023/0006738 A1 Jan. 5, 2023

Related U.S. Application Data

(63) Continuation of application No. PCT/CN2021/078606, filed on Mar. 2, 2021.

(30) Foreign Application Priority Data

Mar. 10, 2020 (CN) .......................... 202010162163.5

(51) Int. Cl.
*H04B 10/073* (2013.01)
*H04B 3/32* (2006.01)
*H04B 10/077* (2013.01)

(52) U.S. Cl.
CPC ............ *H04B 10/077* (2013.01); *H04B 3/32* (2013.01); *H04B 10/073* (2013.01)

(58) Field of Classification Search
None
See application file for complete search history.

(56) References Cited

U.S. PATENT DOCUMENTS 6,534,997 B1* 3/2003 Horishita ............. H04B 10/071 356/73.1
8,676,053 B2* 3/2014 Wang ................. H04B 10/0773 398/33

(Continued)

FOREIGN PATENT DOCUMENTS

CN 101895339 A 11/2010
CN 101931471 A 12/2010

(Continued)

OTHER PUBLICATIONS

Qian, X. et al., "Let "Dumb Resources" Talk—A New Method of Checking the Same Route of Optical Cables," Jul. 2020, 6 pages (with English translation).

*Primary Examiner* — Jai M Lee
(74) *Attorney, Agent, or Firm* — SLATER MATSIL, LLP

(57) ABSTRACT

A co-cable probability detection method, including obtaining information about at least two first events and at least two second events, where the information about the at least two first events is obtained based on a first sounding signal in a first transmission medium, the information about the at least two second events is obtained based on a second sounding signal in a second transmission medium, the information about the first events indicates at least one cable segment on the first transmission medium, and the information about the second events indicates at least one cable segment on the second transmission medium, and obtaining, based on the information about the first events and the second events, a probability that the at least one cable segment on the first transmission medium and the at least one cable segment on the second transmission medium comprise a co-cable segment.

20 Claims, 15 Drawing Sheets

(56) References Cited

U.S. PATENT DOCUMENTS

| | | | |
|---|---|---|---|
| 9,194,763 B2 * | 11/2015 | Hu | H04B 10/071 |
| 9,281,892 B2 * | 3/2016 | Urban | H04B 10/071 |
| 9,847,831 B2 * | 12/2017 | Archambault | H04B 10/0775 |
| 10,491,296 B1 * | 11/2019 | Wellbrock | H04B 10/073 |
| 10,727,938 B2 * | 7/2020 | Haber | H04B 10/27 |
| 11,112,332 B2 * | 9/2021 | Koshikiya | G01M 11/3109 |
| 11,476,939 B2 * | 10/2022 | Kataoka | H04B 10/071 |
| 11,483,067 B2 * | 10/2022 | Matsumoto | H04B 10/40 |
| 11,573,152 B2 * | 2/2023 | Invernizzi | G02B 6/02052 |
| 2020/0044734 A1 | 2/2020 | Parkin | |
| 2022/0086541 A1 * | 3/2022 | Ji | H04B 10/071 |
| 2022/0170765 A1 * | 6/2022 | Yano | G01B 11/16 |
| 2022/0247488 A1 * | 8/2022 | Jiang | G01M 11/3145 |
| 2023/0013049 A1 * | 1/2023 | Luo | G01M 11/3136 |

FOREIGN PATENT DOCUMENTS

| | | |
|---|---|---|
| CN | 102377484 A | 3/2012 |
| CN | 107508632 A | 12/2017 |
| CN | 110601751 A | 12/2019 |
| CN | 110708116 A | 1/2020 |
| WO | 2007048226 A1 | 5/2007 |
| WO | 2014025532 A2 | 2/2014 |

* cited by examiner

CO-CABLE PROBABILITY DETECTION METHOD AND APPARATUS

CROSS-REFERENCE TO RELATED APPLICATIONS

This application is a continuation of International Application No. PCT/CN2021/078606, filed on Mar. 2, 2021, which claims priority to Chinese Patent Application No. 202010162163.5, filed on Mar. 10, 2020. The disclosures of the aforementioned applications are hereby incorporated by reference in their entireties.

TECHNICAL FIELD

This application relates to the communication field, and in particular, to a co-cable probability detection method and an apparatus.

BACKGROUND

A cable is an important transmission medium in a communication system, and is used to transmit data in the communication system. Generally, a cable includes a plurality of cable cores, and a transmission medium connecting two devices may be included in a plurality of cable segments. Optical fibers are used as an example. As important communication media, optical fibers are widely used in communication systems such as high-speed, large-capacity, and low-delay communication systems. Optical fibers are thin and easy to break, and cannot be directly used for connecting devices. For an optical cable, a specific quantity of optical fibers form cable cores in a specific manner. A basic structure of the optical cable includes the cable cores, a reinforced steel wire, a filler, a protective sleeve, and other parts. The optical cable provides effective protection for the optical fibers, so that devices connected through the optical fibers have an engineering-feasible solution. However, as a distance increases, a volume, a weight, and the like of an optical cable increase accordingly. For long-distance transmission devices, a connected optical cable needs to be formed by splicing a plurality of optical cable segments. In addition, one segment of optical cable may include a plurality of optical fibers, and that different optical fibers may be connected to different devices may mean that different optical fibers lead to different directions. The optical fibers in the optical cable need to be split.

A transmission medium connecting two sites for communication is referred to as a communication path, and two communication paths may share a same cable segment. For example, if a communication path 1 includes a cable segment 1 and a cable segment 2, and a communication path 2 includes the cable segment 2 and a cable segment 3, the cable segment 2 is a cable segment shared by the communication path 1 and the communication path 2. The shared cable segment may be referred to as a co-cable segment below. Moreover, once a fault occurs on the co-cable segment of the communication path 1 and the communication path 2, for example, once the co-cable segment is cut off, bent, or pressed, a problem, for example, communication quality deterioration or even interruption, occurs on both the communication path 1 and the communication path 2.

In an existing solution, information about a co-cable between cables is usually manually recorded when the cables are laid. However, manually recording the information about the co-cable may take a long time, resulting in problems such as low efficiency, high maintenance costs, or great maintenance difficulty. Therefore, how to efficiently and accurately determine a cable segment shared by paths becomes an issue to be urgently resolved.

SUMMARY

This application discloses a co-cable probability detection method and an apparatus, to accurately and efficiently detect a probability that different transmission media share a cable segment, so that the cable segment shared by the transmission media can be determined in an accurate and timely manner.

According to a first aspect, this application provides a co-cable probability detection method. The method includes a network device (a controller or a network element) obtains information about at least two first events in a first transmission medium and information about at least two second events in a second transmission medium, where information about at least two first events is obtained based on a first sounding signal transmitted in a first transmission medium, the information about the at least two second events is obtained based on a second sounding signal transmitted in a second transmission medium, the information about the at least two first events indicates at least one cable segment on the first transmission medium, and the information about the at least two second events indicates at least one cable segment on the second transmission medium, and the network device obtains, based on the information about the at least two first events and the information about the at least two second events, a probability that the at least one cable segment on the first transmission medium and the at least one cable segment on the second transmission medium include a co-cable segment, where the co-cable segment is a cable segment shared by the first transmission medium and the second transmission medium.

According to the co-cable probability detection method provided in this application, the probability that the at least one cable segment on the first transmission medium and at least one cable segment on the second transmission medium include a co-cable segment may be obtained based on the information about the at least two first events and the information about the at least two second events. In other words, the probability that the two transmission media share a cable segment is output based on the obtained event information. Therefore, maintenance costs of manual recording can be reduced, a probability that transmission media share a cable segment can be quickly and accurately output, and whether the transmission media share a cable segment can be further determined based on the probability.

In a possible implementation, the obtaining, based on the information about the at least two first events and the information about the at least two second events, a probability that the at least one cable segment on the first transmission medium and the at least one cable segment on the second transmission medium include a co-cable segment may include determining a distance between two adjacent first events in the first transmission medium and a distance between two adjacent second events in the second transmission medium, and matching a distance between any two adjacent first events in the first transmission medium with a distance between any two adjacent second events in the second transmission medium, to obtain the probability that the at least one cable segment on the first transmission medium and the at least one cable segment on the second transmission medium include a co-cable segment.

In this implementation of this application, the distance between the two adjacent events in one of the two transmission media may be matched with the distance between the two adjacent events in the other transmission medium, to obtain the probability that the at least one cable segment on the first transmission medium and the at least one cable segment on the second transmission medium include a co-cable segment. A distance between two adjacent events in a transmission medium may also be referred to as a distance between occurrence points of the two adjacent events on the transmission medium. It can be understood that each transmission medium is divided into a plurality of cable segments based on events in the transmission medium, a distance between two adjacent events may represent a length of one cable segment, and the probability that the at least one cable segment on one of the two transmission media and the at least one cable segment on the other transmission medium include a co-cable segment may be calculated based on a matching degree of lengths of cable segments on the two transmission media. A higher matching degree of the lengths of the cable segments on the two transmission media leads to a larger calculated probability value. Therefore, in this implementation of this application, the probability that the at least one cable segment on one of the two transmission media and the at least one cable segment on the other transmission medium include a co-cable segment may be calculated based on whether lengths of cable segments are close to or equal to each other. In this way, maintenance costs of manual recording can be reduced, a probability that transmission media share a cable segment can be quickly and accurately output, and whether the transmission media share a cable segment can be further determined based on the probability.

In a possible implementation, the obtaining, based on the information about the at least two first events and the information about the at least two second events, a probability that the at least one cable segment on the first transmission medium and the at least one cable segment on the second transmission medium include a co-cable segment may include calculating, based on event types of the at least two first events and event types of the at least two second events, the probability that the at least one cable segment on the first transmission medium and the at least one cable segment on the second transmission medium include a co-cable segment.

In this implementation of this application, the probability that the at least one cable segment on the first transmission medium and the at least one cable segment on the second transmission medium include a co-cable segment may be further calculated with reference to the types of the events in the two transmission media, to further improve accuracy of an obtained probability value.

In addition, on a basis of matching the distance between the any two adjacent events in the first transmission medium with the distance between the any two adjacent events in the second transmission medium, the probability that the at least one cable segment on the first transmission medium and the at least one cable segment on the second transmission medium include a co-cable segment may be calculated with reference to types of two adjacent events in the first transmission medium and types of two adjacent events in the second transmission medium, to further improve the accuracy of the calculated probability value.

In a possible implementation, the events in the first transmission medium and the second transmission medium may include major events, and the major events indicate that a confidence level of a cable segment is greater than or equal to a first preset threshold. The matching a distance between any two adjacent first events in the first transmission medium with a distance between any two adjacent second events in the second transmission medium, to obtain the probability that the at least one cable segment on the first transmission medium and the at least one cable segment on the second transmission medium include a co-cable segment may include matching a distance between any two adjacent major events included in the first transmission medium with a distance between any two adjacent major events included in the second transmission medium, to obtain a major-event similarity, and calculating, based on the major-event similarity, the probability that the at least one cable segment on the first transmission medium and the at least one cable segment on the second transmission medium include a co-cable segment.

In this implementation of this application, the major events included in the events in the first transmission medium and the second transmission medium are screened, the major-event similarity between the two transmission media is calculated based on the distances between the adjacent major events, and the probability that the at least one cable segment on the first transmission medium and the at least one cable segment on the second transmission medium include a co-cable segment is calculated based on the major-event similarity. Generally, due to an obvious characteristic of a major event, accuracy of detecting the major event is higher, and missed detection does not easily occur on the major event. Therefore, a probability value obtained based on a matching degree of the distances between the adjacent major events in the two transmission media is more accurate.

In a specific implementation, the major event is an event in which a reflection height is greater than a preset height or a loss value is greater than a preset loss value. In other words, the major event presents a more obvious characteristic and indicates a higher confidence level.

In a possible implementation, the at least two events include minor events, and the minor events indicate that a confidence level of a cable segment is less than or equal to a second preset threshold. The matching a distance between any two adjacent first events in the first transmission medium with a distance between any two adjacent second events in the second transmission medium, to obtain the probability that the at least one cable segment on the first transmission medium and the at least one cable segment on the second transmission medium include a co-cable segment may include matching a distance between any two adjacent minor events included in the first transmission medium with a distance between any two adjacent minor events included in the second transmission medium, to obtain a minor-event similarity, and calculating, based on the minor-event similarity, the probability that the at least one cable segment on the first transmission medium and the at least one cable segment on the second transmission medium include a co-cable segment.

In this implementation of this application, the events in the transmission media are classified into major events and minor events, and on a basis of calculating, based on the major-event similarity, the probability that the at least one cable segment on the first transmission medium and the at least one cable segment on the second transmission medium include a co-cable segment, the probability that the at least one cable segment on the first transmission medium and the at least one cable segment on the second transmission medium include a co-cable segment is further calculated more precisely with reference to the minor-event similarity.

In a specific implementation, the minor event is an event in which a reflection height is not greater than the preset height or a loss value is not greater than the preset loss value.

In a possible implementation, after the major-event similarity and the minor-event similarity are calculated, the probability that the at least one cable segment on the first transmission medium and the at least one cable segment on the second transmission medium include a co-cable segment is calculated based on the major-event similarity and the minor-event similarity.

Therefore, in this implementation of this application, a co-cable probability may be calculated with reference to the major events and the minor events, so that the obtained co-cable probability is more precise.

In a possible implementation, the obtaining, based on the information about the at least two first events and the information about the at least two second events, a probability that the at least one cable segment on the first transmission medium and the at least one cable segment on the second transmission medium include a co-cable segment further includes the at least two first events and the at least two second events include a same reference event, and the reference event is an event generated by the first sounding signal and the second sounding signal at a same cable location, and matching a distance between at least one first event in the first transmission medium and the reference event with a distance between at least one second event in the second transmission medium and the reference event, to obtain the probability that the at least one cable segment on the first transmission medium and the at least one cable segment on the second transmission medium include a co-cable segment.

In this implementation of this application, for a scenario in which the two transmission media have a same event, a distance between an event in one of the two transmission media and the same event may be further matched with a distance between an event in the other transmission medium and the same event. This can simplify co-cable probability calculation.

In a specific implementation, if the first sounding signal and the second sounding signal are corresponding to a same source node or a same sink node, a distance between each first event in the first transmission medium and a same node and a distance between each second event in the second transmission medium and the same node are calculated. The same node is a node common to the first sounding signal and the second sounding signal, and may be a same source node or a same sink node. If the two sounding signals are corresponding to both a same source node and a same sink node, either the source node or the sink node may be used as the same node. The distance between each first event in the first transmission medium and the same node is matched with the distance between each second event in the second transmission medium and the same node, to obtain the probability that the at least one cable segment on the first transmission medium and the at least one cable segment on the second transmission medium include a co-cable segment. In this implementation of this application, if the two transmission media have a same source or a same sink, the probability that the at least one cable segment on the first transmission medium and the at least one cable segment on the second transmission medium include a co-cable segment may be calculated based on the distances between the events in the two transmission media and the same node. In this way, a probability that the two transmission media include a co-cable segment in a same source or same sink scenario can be further calculated.

In a possible implementation, the matching a distance between at least one first event in the first transmission medium and the reference event with a distance between at least one second event in the second transmission medium and the reference event, to obtain the probability that the at least one cable segment on the first transmission medium and the at least one cable segment on the second transmission medium include a co-cable segment may include matching the distance between the at least one first event in the first transmission medium and the reference event with the distance between the at least one second event in the second transmission medium and the reference event, to obtain at least one event similarity, and calculating, based on the at least one event similarity, the probability that the at least one cable segment on the first transmission medium and the at least one cable segment on the second transmission medium include a co-cable segment.

In this implementation of this application, the distance between the at least one event in one of the two transmission media and the reference event may be matched with the distance between the at least one event in the other transmission medium and the reference event, to obtain the at least one event similarity, and the co-cable probability between the two transmission media may be calculated based on the at least one event similarity. In this way, a co-cable probability in a scenario in which the two transmission media have a same event can be accurately calculated.

In a specific implementation, two events may be determined from the at least one first event as a first start event and a first end event, and two events may be determined from the at least one second event as a second start event and a second end event. Then, the probability that the at least one cable segment on the first transmission medium and the at least one cable segment on the second transmission medium include a co-cable segment is calculated based on distances between the first start event in the first transmission medium and the same node and between the first end event in the first transmission medium and the same node, and distances between the second start event in the second transmission medium and the same node and between the second end event in the second transmission medium and the same node. A start event similarity is a similarity between the distance between the same node and the first start event in the first transmission medium and the distance between the same node and the second start event in the second transmission medium, and an end event similarity is a similarity between the distance between the same node and the first end event in the first transmission medium and the distance between the same node and the second end event in the second transmission medium. Afterwards, the probability that the at least one cable segment on the first transmission medium and the at least one cable segment on the second transmission medium include a co-cable segment is calculated based on the start event similarity and the end event similarity.

It can be understood that if the two transmission media have a same source or a same sink, the probability that the at least one cable segment on the first transmission medium and the at least one cable segment on the second transmission medium include a co-cable segment may be calculated based on the distances between the start events in the two transmission media and the same node and the distances between the end events in the two transmission media and the same node. In this way, a probability that the two transmission media include a co-cable segment in a same source or same sink scenario can be further calculated.

In a possible implementation, the obtaining information about at least two first events and information about at least two second events may include receiving user-specified information, and triggering, based on the user-specified information, to obtain the information about the at least two first events and the information about the at least two second events, where the user-specified information includes an identifier of the first transmission medium and an identifier of the second transmission medium.

In this implementation of this application, detection on the probability that the two transmission media share a cable segment may be triggered by a user, so that the probability that the two transmission media share a cable segment can be detected depending on a requirement of the user, thereby improving user experience.

In a possible implementation, before the obtaining information about at least two first events and information about at least two second events, the method includes detecting that the first transmission medium and the second transmission medium are newly added transmission media, or detecting that a fault occurs on a service path on the first transmission medium or the second transmission medium. It can be understood that if it is detected that the first transmission medium or the second transmission medium exists, or if it is detected that data transmitted in the first transmission medium or the second transmission medium satisfies a trigger condition, obtaining of the information about the at least two first events and the information about the at least two second events is triggered. The trigger condition may indicate that a fault occurs on the service path on the first transmission medium or the second transmission medium. The trigger condition may include the data transmitted in the first transmission medium or the second transmission medium is interrupted, a sudden change in attenuation of the data transmitted in the first transmission medium or the second transmission medium exceeds a threshold, or the like.

In this implementation of this application, when it is detected that the first transmission medium or the second transmission medium changes, for example, when the first transmission medium or the second transmission medium is a newly added transmission medium, or an abnormality, for example, interruption or a sudden increase in attenuation occurs on the data transmitted in the first transmission medium or the second transmission medium, detection on the probability that the two transmission media share a cable segment may be triggered. In this way, a probability that transmission media in a communication network share a cable segment can be updated in a timely manner.

In a possible implementation, after the obtaining a probability that the at least one cable segment on the first transmission medium and the at least one cable segment on the second transmission medium include a co-cable segment, the method may further include if the probability that the at least one cable segment on the first transmission medium and the at least one cable segment on the second transmission medium include a co-cable segment is higher than a warning threshold, generating co-cable risk warning information, where the co-cable risk warning information is used to warn that a shared cable segment exists between the first transmission medium and the second transmission medium.

In this implementation of this application, if the probability that the two transmission media include a co-cable segment is higher than the warning threshold, a co-cable segment risk may be warned, so that the user can process the co-cable segment between the two transmission media in a timely manner based on the warning, thereby improving data transmission stability.

In a possible implementation, the first transmission medium and the second transmission medium satisfy one or more of the following the first transmission medium and the second transmission medium are paths for transmitting data of a same service, or the first transmission medium and the second transmission medium are two transmission media in a preset risk group, where the preset risk group includes at least one pair of transmission media whose probability of sharing a cable segment is greater than a preset probability.

In this implementation of this application, transmission media whose probability of sharing a cable segment needs to be detected in the communication network may be preliminarily screened, to screen transmission media that satisfy a condition. This avoids meaningless detection on a probability of sharing a cable segment, and improves effectiveness and efficiency of detection on a probability of sharing a cable segment.

In a possible implementation, the information about the at least two first events may include event types of the first events and/or locations of the first events on the first transmission medium, and the information about the at least two second events may include event types of the second events and/or locations of the second events on the second transmission medium.

Therefore, in this implementation of this application, a distance between two events in the first transmission medium and a distance between two events in the second transmission medium may be calculated based on the information about the at least two first events and the information about the at least two second events, so that the probability that the first transmission medium and the second transmission medium share a cable segment may be calculated based on the distance between the two events in one of the two transmission media and the distance between the two events in the other transmission medium or the event types.

In a possible implementation, information about the at least one first event and information about the at least one second event may be obtained through detection by an optical time domain reflectometer (OTDR). If the information about the at least one first event and the information about the at least one second event are obtained through detection by the OTDR, the information about the at least one first event and the information about the at least one second event may include one or more of event locations, event types, event confidence levels, reflection heights, or attenuation magnitudes.

Therefore, in this implementation of this application, the information about the events in the two transmission media may be obtained through detection by the OTDR, to obtain specific information of each event in the transmission medium. In this way, the probability that the two transmission media share a cable segment can be accurately calculated based on the information about the events.

According to a second aspect, this application provides a network device. The network device includes an obtaining unit, configured to obtain information about at least two first events and information about at least two second events, where the information about the at least two first events is obtained based on a first sounding signal transmitted in a first transmission medium, the information about the at least two second events is obtained based on a second sounding signal transmitted in a second transmission medium, the information about the at least two first events indicates at least one cable segment on the first transmission medium, and the information about the at least two second events indicates at least one cable segment on the second transmission medium, and a processing unit, configured to obtain, based on the information about the at least two first events and the information about the at least two second events, a probability that the at least one cable segment on the first transmission medium and the at least one cable segment on the second transmission medium include a co-cable segment, where the co-cable segment is a cable segment shared by the first transmission medium and the second transmission medium.

For beneficial effects produced by any one of the second aspect or the possible implementations of the second aspect, refer to the descriptions of any one of the first aspect or the possible implementations of the first aspect. In a possible implementation, the processing unit is specifically configured to determine a distance between any two adjacent first events in the first transmission medium and a distance between any two adjacent second events in the second transmission medium, and match the distance between the any two adjacent first events in the first transmission medium with the distance between the any two adjacent second events in the second transmission medium, to obtain the probability that the at least one cable segment on the first transmission medium and the at least one cable segment on the second transmission medium include a co-cable segment. A distance between two adjacent events in a transmission medium may also be referred to as a distance between occurrence points of the two adjacent events on the transmission medium.

In a possible implementation, the at least two first events and the at least two second events include major events, and the major events indicate that a confidence level of a cable segment is greater than or equal to a first preset threshold. The processing unit is specifically configured to match a distance between any two adjacent major events included in the first transmission medium with a distance between any two adjacent major events included in the second transmission medium, to obtain a major-event similarity, and calculate, based on the major-event similarity, the probability that the at least one cable segment on the first transmission medium and the at least one cable segment on the second transmission medium include a co-cable segment.

In a possible implementation, the at least two first events and the at least two second events include minor events, and the minor events indicate that a confidence level of a cable segment is less than or equal to a second preset threshold. The processing unit is configured to match a distance between any two adjacent minor events included in the first transmission medium with a distance between any two adjacent minor events included in the second transmission medium, to obtain a minor-event similarity, and calculate, based on the minor-event similarity, the probability that the at least one cable segment on the first transmission medium and the at least one cable segment on the second transmission medium include a co-cable segment.

In a possible implementation, the at least two first events and the at least two second events include a reference event, and the reference event is an event generated by the first sounding signal and the second sounding signal at a same cable location. The processing unit is further configured to match a distance between at least one first event in the first transmission medium and the reference event with a distance between at least one second event in the second transmission medium and the reference event, to obtain the probability that the at least one cable segment on the first transmission medium and the at least one cable segment on the second transmission medium include a co-cable segment.

In a possible implementation, the processing unit is further specifically configured to match the distance between the at least one first event in the first transmission medium and the reference event with the distance between the at least one second event in the second transmission medium and the reference event, to obtain at least one event similarity, and calculate, based on the at least one event similarity, the probability that the at least one cable segment on the first transmission medium and the at least one cable segment on the second transmission medium include a co-cable segment.

In a possible implementation, the processing unit is further configured to calculate, based on event types of the at least two first events and event types of the at least two second events, the probability that the at least one cable segment on the first transmission medium and the at least one cable segment on the second transmission medium include a co-cable segment.

In a possible implementation, the network device further includes a first triggering unit, configured to receive user-specified information, and trigger, based on the user-specified information, a transceiver unit to obtain the information about the at least two first events and the information about the at least two second events, where the user-specified information includes an identifier of the first transmission medium and an identifier of the second transmission medium.

In a possible implementation, the network device further includes a second triggering unit, configured to if it is detected that the first transmission medium or the second transmission medium exists, or if it is detected that data transmitted in the first transmission medium or the second transmission medium satisfies a trigger condition, trigger obtaining of the information about the at least two first events and the information about the at least two second events. The trigger condition includes the data transmitted in the first transmission medium or the second transmission medium is interrupted, or a sudden change in attenuation of the data transmitted in the first transmission medium or the second transmission medium exceeds a threshold.

In a possible implementation, the processing unit is further configured to after obtaining the probability that the at least one cable segment on the first transmission medium and the at least one cable segment on the second transmission medium include a co-cable segment, if the probability that the at least one cable segment on the first transmission medium and the at least one cable segment on the second transmission medium include a co-cable segment is higher than a warning threshold, generate co-cable risk warning information, where the co-cable risk warning information is used to warn that a shared cable segment exists between the first transmission medium and the second transmission medium.

In a possible implementation, the first transmission medium or the second transmission medium satisfies one or more of the following the first transmission medium and the second transmission medium are paths for transmitting data of a same service, or the first transmission medium and the second transmission medium are two transmission media in a preset risk group, where the preset risk group includes at least one pair of transmission media whose probability of sharing a cable segment is greater than a preset probability.

In a possible implementation, the information about the at least two first events may include event types of the first events and/or locations of the first events on the first transmission medium, and the information about the at least two second events may include event types of the second events and/or locations of the second events on the second transmission medium.

According to a third aspect, this application provides a network device, including a processor and a memory. The processor and the memory are connected through a line, and the processor invokes program code in the memory to perform a processing-related function in the co-cable probability detection method described in any one of the first aspect or the implementations of the first aspect.

According to a fourth aspect, this application provides a communication system, including a network device and at least one node. Data is transmitted between the at least one node through a connected transmission medium. The network device is described in the second aspect.

According to a fifth aspect, an embodiment of this application provides a digital processing chip. The chip includes a processor and a memory, the memory and the processor are connected through a line, the memory stores instructions, and the processor is configured to perform a processing-related function in the method in any one of the first aspect or the implementations of the first aspect.

According to a sixth aspect, an embodiment of this application provides a computer-readable storage medium, including instructions. When the instructions are run on a computer, the computer is enabled to perform the method in any one of the first aspect or the implementations of the first aspect.

According to a seventh aspect, an embodiment of this application provides a computer program product including instructions. When the instructions are run on a computer, the computer is enabled to perform the method in any one of the first aspect or the implementations of the first aspect.

BRIEF DESCRIPTION OF THE DRAWINGS

FIG. 1 is a schematic diagram of a manner of calculating a co-cable probability according to this application;

DETAILED DESCRIPTION OF ILLUSTRATIVE EMBODIMENTS

The following describes the technical solutions in embodiments of this application with reference to the accompanying drawings in embodiments of this application. It is clear that the described embodiments are merely some but not all embodiments of this application. All other embodiments obtained by a person of ordinary skill in the art based on embodiments of this application without creative efforts shall fall within the protection scope of this application.

First, a co-cable probability detection method provided in this application can be applied to various communication systems, such as electrical communication systems or optical communication networks, and is used to detect a cable segment shared by two transmission media. The electrical communication systems may include a digital subscriber line (DSL), an asymmetric digital subscriber line (ADSL), a rate adaptive digital subscriber line (RADSL), and the like. The optical communication networks include but are not limited to any one or a combination of an optical transport network (OTN), an optical access network (OAN), a synchronous digital hierarchy (SDH), and a passive optical network (PON), an Ethernet, a flexible Ethernet (FlexE), and a wavelength division multiplexing (WDM) network.

Figure 1:
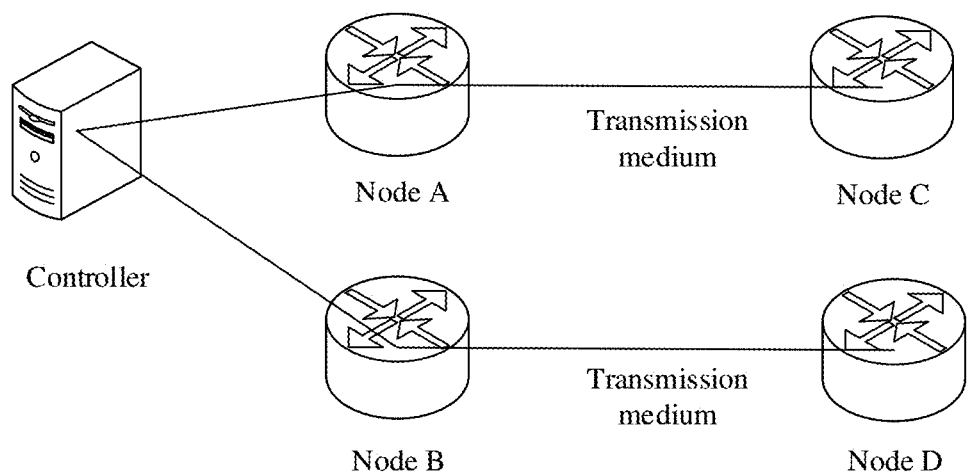
FIG. 1 is a schematic diagram of a structure of a communication system according to this application.

With reference to a communication network shown in FIG. 1, the following uses an example to describe a communication system to which the co-cable probability detection method provided in this application is applied. The optical communication system may include a controller and at least one node connected to the controller. The at least one node is a node A, a node B, a node C, and a node D shown in FIG. 1. The nodes are connected to each other through transmission media such as twisted pairs, coaxial cables, or optical fibers. Electrical cables such as twisted pairs or coaxial cables are used to transmit electrical signals, and optical fibers are used to transmit optical signals. Certainly, the four nodes herein are merely examples for description, and more or fewer nodes may be included in an actual application scenario. This is not limited in this application.

The controller may be an independent device in the communication network, or the controller may be integrated into a server or a network management system in the communication network. For example, the controller may be integrated into a software defined network (SDN) controller or a path computation element (PCE). The node connected to the controller may be a network element in the communication network, for example, an optical network terminal (ONT), a multiplexer unit (MXU), an optical line terminal (OLT), a switch, or a router.

The controller is configured to detect a probability that at least one cable segment on one of at least two transmission media and at least one cable segment on another transmission medium in the at least two transmission media include a co-cable segment. The at least two transmission media may be optical fibers, conducting wires, or the like connected between two or more nodes in the communication network. The controller may be specifically configured to perform the co-cable probability detection method in FIG. 5 to FIG. 13.

Figure 2A:
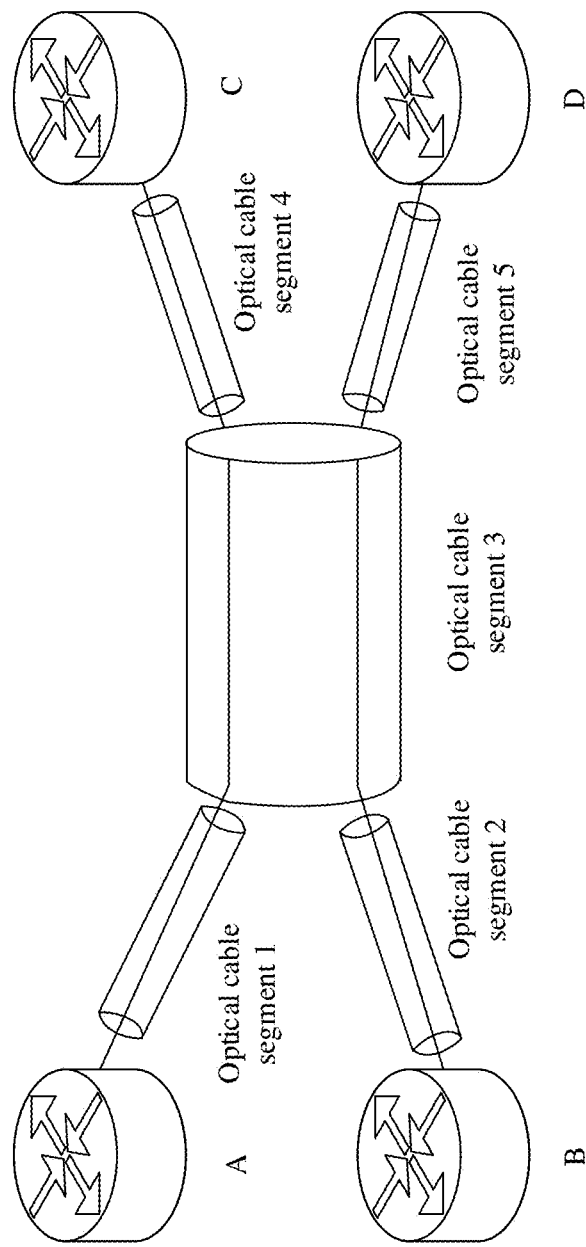
FIG. 2A is a schematic diagram of an optical cable segment shared by two optical fibers.

For ease of understanding, with reference to FIG. 2A, the following uses an optical communication system as an example to describe a specific application scenario of the co-cable probability detection method provided in this application. The application scenario may include at least two optical communication devices, such as a device A, a device B, a device C, and a device D shown in FIG. 2A. The device A and the device C are connected to each other through an optical fiber, and the device B and the device D are connected to each other through an optical fiber.

An optical fiber is usually included in an optical cable. Because a length of one segment of optical cable is limited, a plurality of segments of optical cables may be connected to each other through a fiber distribution terminal or a junction box, or it can be understood that a fiber distribution terminal, a junction box, or the like divides an optical cable into a plurality of optical cable segments. As shown in FIG. 2A, the optical fiber connected between the device A and the device C may be included in an optical cable segment 1, an optical cable segment 3, and an optical cable segment 4, and the optical fiber connected between the device B and the device D may be included in an optical cable segment 2, the optical cable segment 3, and an optical cable segment 5. Therefore, the optical cable segment 3 is an optical cable segment shared by the optical fiber connected between the device A and the device C and the optical fiber connected between the device B and the device D.

Although an optical cable protects optical fibers, once a fault occurs on the optical cable (for example, once the optical cable is cut off, bent, or pressed), faults occur on all optical fibers passing through the optical cable, and communication quality deterioration or even interruption, or the like occurs. Therefore, to improve communication reliability, active/standby protection is usually used. To be specific, there are a plurality of optical fibers connected between two devices, and when a fault occurs on an active path, service data may be switched to a standby path for transmission.

Figure 2B:
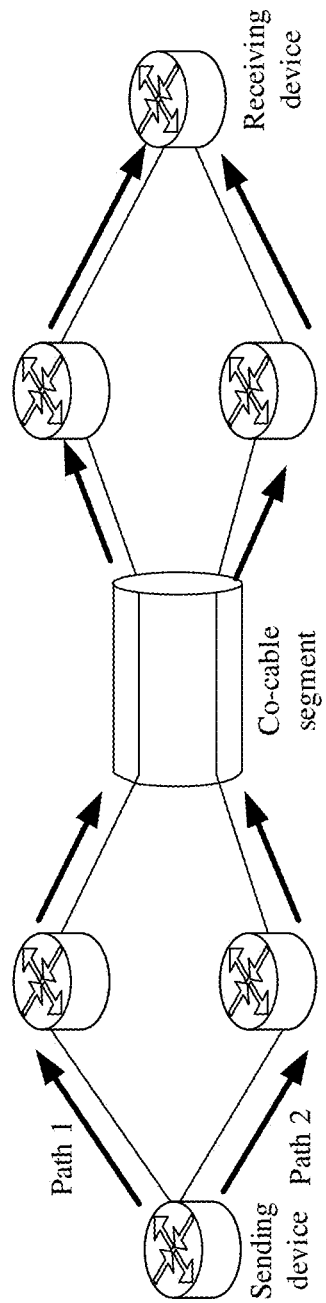
FIG. 2B is another schematic diagram of an optical cable segment shared by two optical fibers.

However, when the active path and the standby path have a co-cable, if a fault occurs on a shared optical cable segment, for example, if the shared optical cable segment is cut off, bent, or pressed, data cannot be transmitted between the two devices, the active/standby protection fails, and the active path and the standby path cannot be protected. For example, as shown in FIG. 2B, a path 1 and a path 2 formed by optical fibers exist between a sending device and a receiving device. The path 1 and the path 2 have a co-cable segment. If a fault occurs on the co-cable segment, for example, if the co-cable segment is cut off, bent, or pressed, transmission on both the path 1 and the path 2 is interrupted, and data transmission between the sending device and the receiving device is affected or even cannot be performed. Therefore, to avoid a risk that the active/standby paths have a co-cable, it is necessary to quickly and accurately identify a co-cable segment in a manner that can adapt to dynamic network changes. When the "path" mentioned herein is used to bear service data, the "path" may also be referred to as a "service path".

Whether two optical fibers have a co-cable may be detected by using information that is about a geographic location for laying an optical cable and that is recorded during optical cable laying and information about a device in the optical cable, for example, information about an optical distribution frame (ODF), a fiber distribution terminal, a junction box, a pipe, or a pole. Then, based on the information about the device, matching is performed on the two optical fibers to determine whether a shared cable segment exists between the two optical fibers. However, if the information about the device that the optical cable passes through is manually recorded, high labor costs are needed, and when some devices in the optical cable or the optical cable are/is changed or updated, manual maintenance is needed. The updated devices or optical cable possibly cannot be manually recorded in a timely manner. As a result, an optical cable segment shared by the two optical fibers cannot be recorded in a timely manner, affecting data transmission between devices.

In view of this, this application provides a co-cable probability detection method, to automatically detect a probability that a shared cable segment exists between at least one cable segment on one of two optical transmission media and at least one cable segment on the other optical transmission medium, thereby reducing labor costs and detecting a co-cable probability in an accurate and timely manner.

For ease of understanding, the following interprets terms in this application.

An optical fiber is a fiber made of glass or plastic and is used as an optical conduction means for transmitting data between transmission devices.

Figure 3:
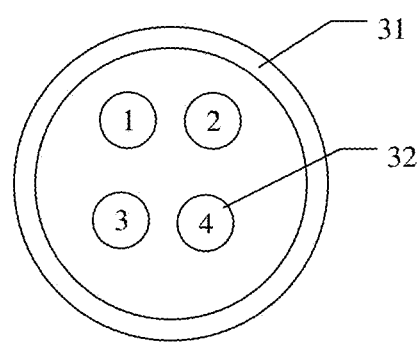
FIG. 3 is a schematic diagram of a cross-section of an optical cable according to an embodiment of this application.

An optical cable is a communication cable used to transmit optical signals through its internal fiber cores to implement large-capacity information communication. Generally, as a distance increases, a volume and a weight of an optical cable increase accordingly. Therefore, for data transmission between devices with a long distance that cannot be implemented by using one segment of optical cable, a plurality of segments of optical cables need to be spliced together. In addition, one segment of optical cable may include one or more optical fibers, and the one or more optical fibers are wrapped with a protective sleeve or the like. FIG. 3 shows an example structure of a cross-section of an optical cable. The optical cable includes a protective sleeve 31, and the protective sleeve 31 wraps four optical fibers 32: an optical fiber 1, an optical fiber 2, an optical fiber 3, and an optical fiber 4 in FIG. 3. Moreover, other components such as a filler and a power cable are further disposed in the optical cable. In this application, only a structural relationship between the optical cable and the optical fiber is described herein, and other components included in the optical cable are not limited. Similar to FIG. 3, electrical cables such as coaxial cables or twisted pairs may be alternatively included in a larger electrical cable, that is, 1, 2, 3, and 4 in FIG. 3 may be alternatively electrical cables such as coaxial cables or twisted pairs in a larger electrical cable.

An optical time domain reflectometer (OTDR) is configured to detect information about an event in an optical fiber, and is specifically configured to detect information about a reflection event and a non-reflection event in the optical fiber. A working principle of the OTDR is similar to that of a radar. For example, the OTDR sends a test laser pulse, namely, an optical sounding signal, to the optical fiber. Then, a value of power of an echo signal returned (including Rayleigh scattering and Fresnel reflection) from each point on the optical fiber is obtained, to obtain echo power information. By analyzing echo characteristics in the echo power information, an event type of each event in the optical fiber (for example, an optical fiber head end, a splice point, a movable connector, a fracture, a mechanical connector, bending, or an optical fiber tail end) and a location of each event in the optical fiber can be obtained. It can be understood that, according to a backscattering principle and a Fresnel reflection principle of light, the OTDR obtains attenuation information by using backscattering light generated when light is propagated in the optical fiber. The OTDR may be configured to measure optical fiber attenuation or a splice loss, locate a fault point of the optical fiber, learn of a distribution of optical fiber losses along optical fiber lengths, or the like. The OTDR may be deployed in a node or the controller in FIG. 1, and is configured to collect information about events in the optical fiber connecting the nodes. In the following implementations of this application, the information about the events obtained by the OTDR may include locations of the events relative to the optical fiber head end, event types, event confidence levels, reflection heights, attenuation magnitudes, or the like.

Figure 4:
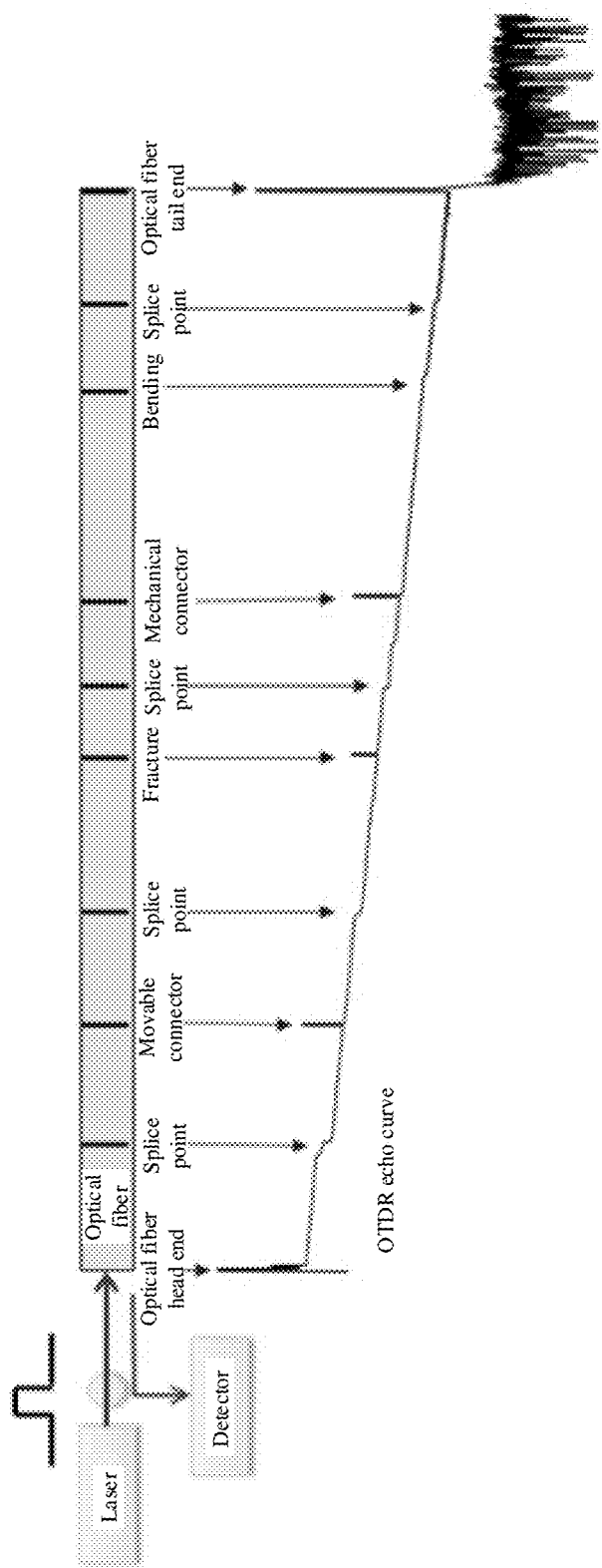
FIG. 4 is a schematic diagram of a mapping relationship between an echo curve detected by an OTDR and an event type according to an embodiment of this application.

For example, FIG. 4 is a schematic diagram of events in an optical fiber and echo characteristics. A laser is configured to transmit an optical sounding signal, and a detector is configured to detect an echo signal returned from each point on the optical fiber. The optical sounding signal is transmitted from an optical fiber head end, and there may be events such as splice points, a movable connector, a fracture, a mechanical connector, bending, or an optical fiber tail end in the optical fiber.

Event types of the optical fiber may include a reflection event and a non-reflection event. Generally, optical fiber splicing and bending may cause optical power attenuation, but do no cause a reflection phenomenon. Such events are collectively referred to as non-reflection events. A fixed mechanical connector, a movable connector, an optical fiber fracture, and the like all cause light reflection and attenuation, and a high reflection peak appears on an OTDR echo curve. Such events are collectively referred to as reflection events. The OTDR echo curve is a curve of power values of the echo signal. In addition, a high reflection peak also appears at an optical fiber head end or an optical fiber tail end on the OTDR echo curve. Such two types of events are also collectively referred to as reflection events. Generally, on the OTDR echo curve, a reflection event usually causes a reflection peak to appear on the OTDR echo curve, and a non-reflection event usually causes power attenuation. For example, a poorer manufacturing process of a splice point leads to greater attenuation.

The event types of the optical fiber may further include major events and minor events. The major event may be further an event in which a reflection height is greater than a preset height, a loss value is greater than a preset loss value, a negative gain is greater than a preset gain value, or the like. For example, an event in which the reflection height is greater than 0.3 dB, the attenuation value is greater than 0.2 dB, or the negative gain is greater than 0.3 dB is used as a major event. The minor event may be further an event in which a reflection height is not greater than the preset height, a loss value is not greater than the preset loss value, a negative gain is not greater than the preset gain value, or the like. For example, an event in which the reflection height is less than or equal to 0.3 dB, the attenuation value is less than or equal to 0.2 dB, or the negative gain is less than or equal to 0.3 dB is used as a minor event. A display result of a major event on the OTDR echo curve is more obvious than that of a minor event, and generally missed detection does not easily occur on the major event. Therefore, a detection confidence level of the major event is high, and endpoints of a cable can be accurately detected.

An ODF is used for termination and distribution of trunk optical cables at a central office, and can facilitate connections, distribution, scheduling, and the like of optical fibers.

An FDT is short for a fiber distribution terminal, is a passive device, and is used to divide optical cables with a larger logarithm into optical cables with a smaller logarithm in different transmission directions.

Based on the foregoing descriptions, the following details the co-cable probability detection method provided in this application.

Figure 5:
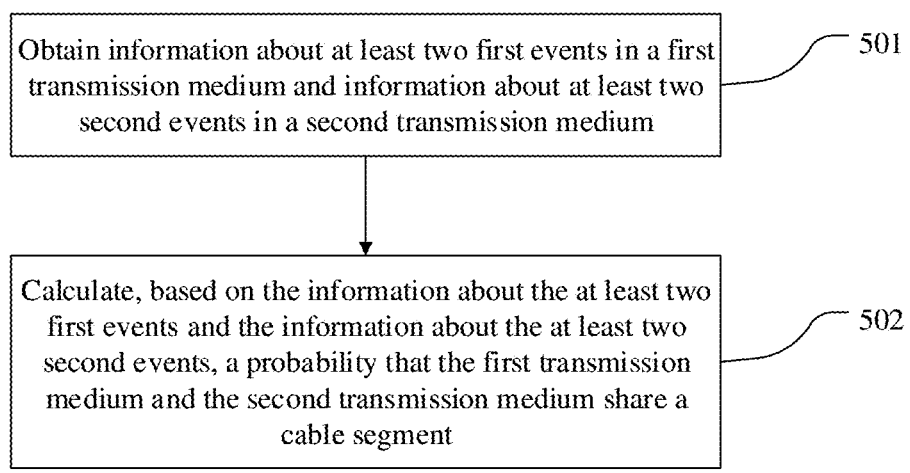
FIG. 5 is a schematic flowchart of a co-cable probability detection method according to this application.

With reference to FIG. 5, the following describes a procedure for the co-cable probability detection method provided in this application. Details are as follows. The method may be performed by a controller or a node (or a network element).

501: Obtain information about at least two first events in a first transmission medium and information about at least two second events in a second transmission medium.

The first transmission medium and the second transmission medium are transmission media for transmitting data between any two or more devices in the foregoing communication system. For example, for the first transmission medium and the second transmission medium, refer to the path 1 and the path 2 in FIG. 2B.

The information about the events in the transmission medium may be obtained by transmitting a sounding signal in the transmission medium. If the transmission medium is an electrical cable, an electrical sounding signal may be transmitted to the electrical cable. If the transmission medium is an optical fiber, an optical sounding signal may be transmitted to the optical fiber. In addition, the at least two events in the transmission medium are used to indicate at least one cable segment on the transmission medium. Using an optical fiber as an example, two adjacent events may be two ends of one segment of optical cable. Therefore, at least two events in the optical fiber may indicate at least one optical cable segment corresponding to the optical fiber. Moreover, a length of one segment of optical cable may be calculated based on a distance between two adjacent events. Specifically, events in the optical cable may include but are not limited to an optical fiber head end of a sounding signal, a splice point, a movable connector, a mechanical connector, bending, a fracture, and an optical fiber tail end of the sounding signal.

Therefore, the information about the events may include event types and/or locations of the events in the optical fiber (or a distance between two adjacent events), and the like. The event types may include a reflection event, a non-reflection event, a major event, a minor event, and the like, and may further include specific events, such as an optical fiber head end, a splice point, a movable connector, a fracture, a mechanical connector, bending, and an optical fiber tail end.

Specifically, the information about the at least two first events and the information about the at least two second events may be obtained in a plurality of manners. For ease of understanding, the following describes, only by using an example in which the transmission medium is an optical fiber, a plurality of manners of obtaining the information about the at least two first events and the information about the at least two second events in this application. The optical fiber may be replaced with an electrical cable, for example, a twisted pair or a coaxial cable. The OTDR may be replaced with a TDR. The obtained event information may include an impedance coefficient of a transmission medium, where the impedance coefficient is used to locate an event in the electrical cable, for example, a fault point or a connector.

Manner 1: The controller receives information about events in a transmission medium sent by a node.

A device for collecting information about events in a transmission medium, for example, an OTDR or a TDR, is disposed in a node in a communication network. Using an OTDR as an example, one or more OTDRs disposed in a node may send a first optical sounding signal to a first optical fiber and send a second optical sounding signal to a second optical fiber. The OTDR receives an echo power signal of the first optical fiber and an echo power signal of the second optical fiber, and then obtains information about at least two first events in the first optical fiber based on the echo power signal of the first optical fiber, and identifies information about at least two second events based on the echo power signal of the second optical fiber. It should be understood that the first optical sounding signal and the second optical sounding signal may be identical or different, and may be specifically adjusted depending on an actual application scenario. This is not limited herein.

Figure 6:
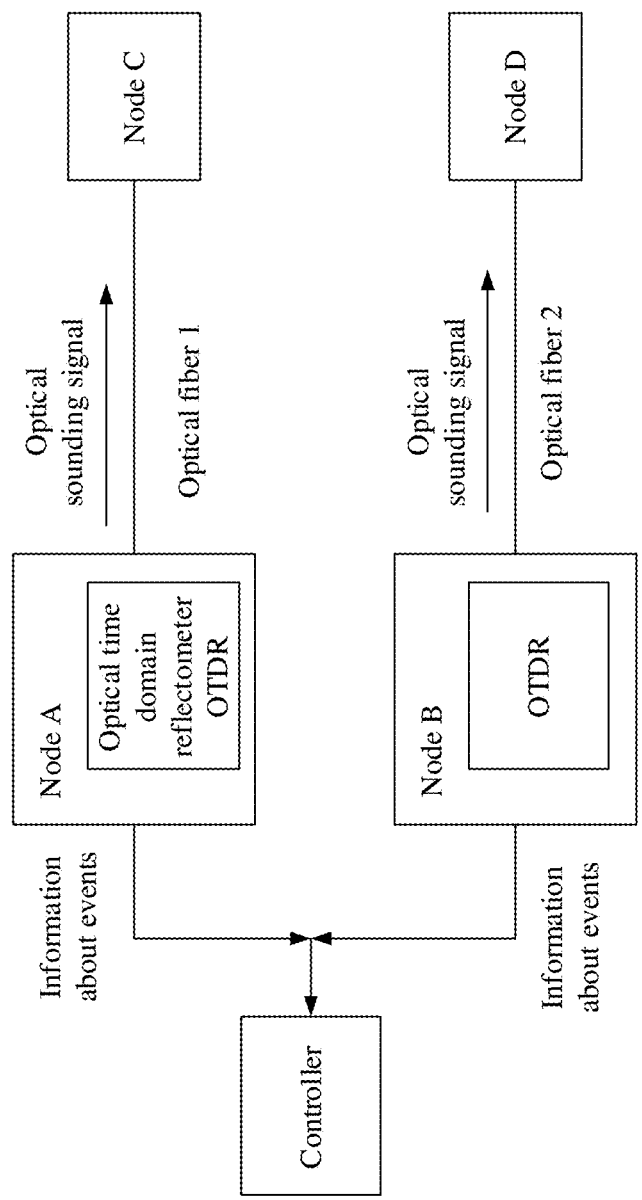
FIG. 6 is a schematic diagram of a scenario of calculating a co-cable probability according to this application.

For example, the following describes a specific application scenario of the manner 1 with reference to FIG. 6. This scenario is similar to the optical communication system shown in FIG. 1. A node A and a node C are connected to each other through an optical fiber 1, and a node B and a node D are connected to each other through an optical fiber 2. The optical fiber 1 and the optical fiber 2 can be understood as the first optical fiber and the second optical fiber. Generally, the node A and the node B may be optical fiber head ends of optical sounding signals. An OTDR is disposed in each of the node A and the node B. The OTDRs may send optical sounding signals respectively to the node C and the node D, and receive echo signals returned from the optical fibers. The node A or the node B may extract echo characteristics by using the echo signal returned from the optical fiber, and analyze information about events in the optical fiber, including event types and/or locations of the events in the optical fiber (or a distance between two adjacent events), and the like. Then, the node A and the node B send the collected information about the events to the controller, and the controller continues to perform step 502 based on the received information about the events.

Figure 7:
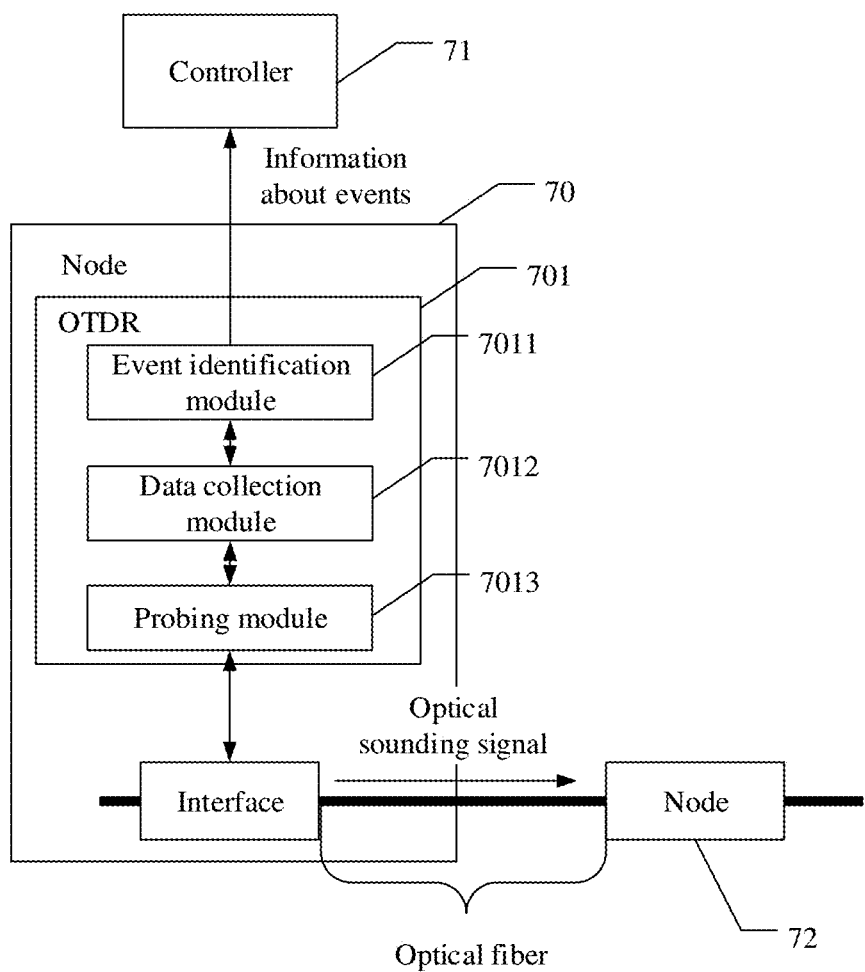
FIG. 7 is another schematic diagram of a scenario of calculating a co-cable probability according to this application.

With reference to FIG. 7, the following provides a more detailed description by using a node 70 with an OTDR 701 disposed as an example. The node 70 with the OTDR 701 disposed may be an optical fiber head end of an optical sounding signal, a node 72 may be an optical fiber tail end, and one OTDR may be disposed in each optical fiber. The OTDR 701 may specifically include but is not limited to a probing module 7013, a data collection module 7012, and an event identification module 7011. The probing module 7013 may be configured to transmit an optical sounding signal to an optical fiber through an interface of the node, and receive, through the interface of the node, an echo signal returned from the optical fiber. The interface is an optical communication interface of the node 70, and is configured to transmit an optical signal. Certainly, if the probing module is directly connected to the optical fiber, the probing module may alternatively transmit the optical sounding signal directly in the optical fiber without using the interface. The data collection module 7012 collects data of the echo signal returned from the optical fiber, for example, information such as duration or a value of power of the echo signal relative to the transmitted optical sounding signal. The event identification module 7011 is configured to perform event identification on the data collected by the data collection module 7012, identify an event type of each event and/or a location of the event in the optical fiber (or a distance between two adjacent events), and send the event information to the controller.

Manner 2: The controller obtains information about events by using a built-in OTDR.

The OTDR is disposed inside the controller, and the controller may obtain, by using the internally disposed OTDR, information about events in an optical fiber connected to the controller.

Figure 8:
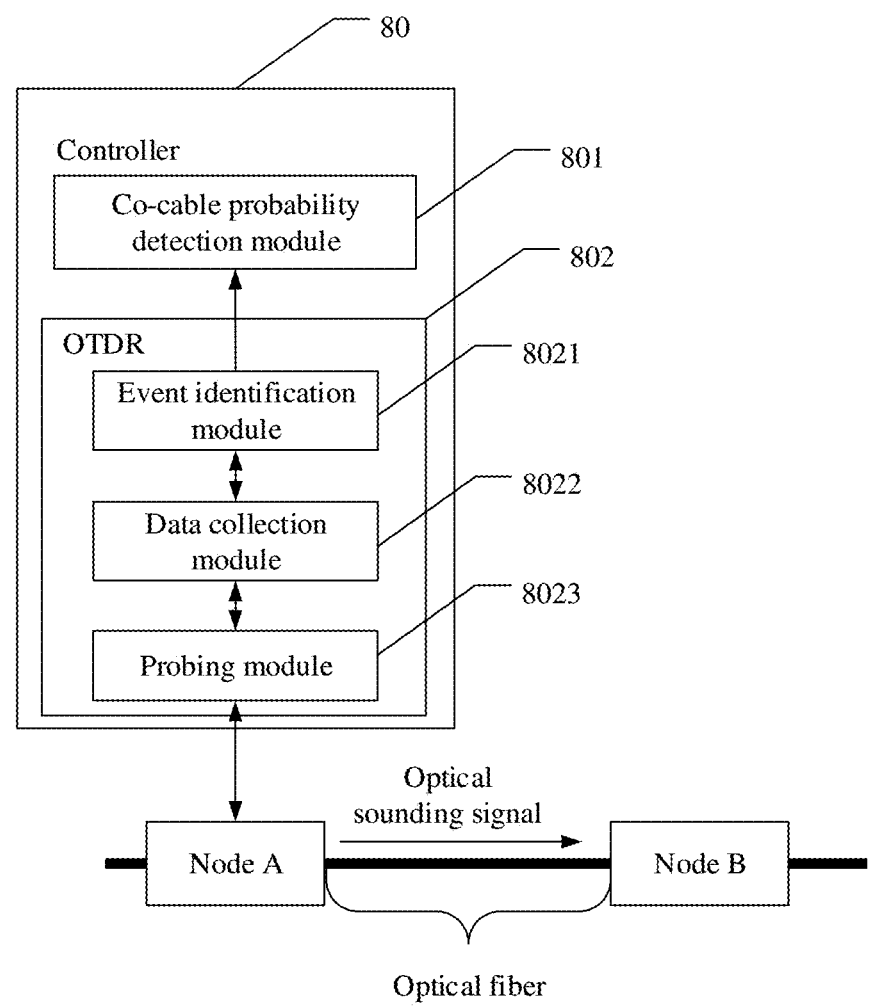
FIG. 8 is another schematic diagram of a scenario of calculating a co-cable probability according to this application.
Figure 9:
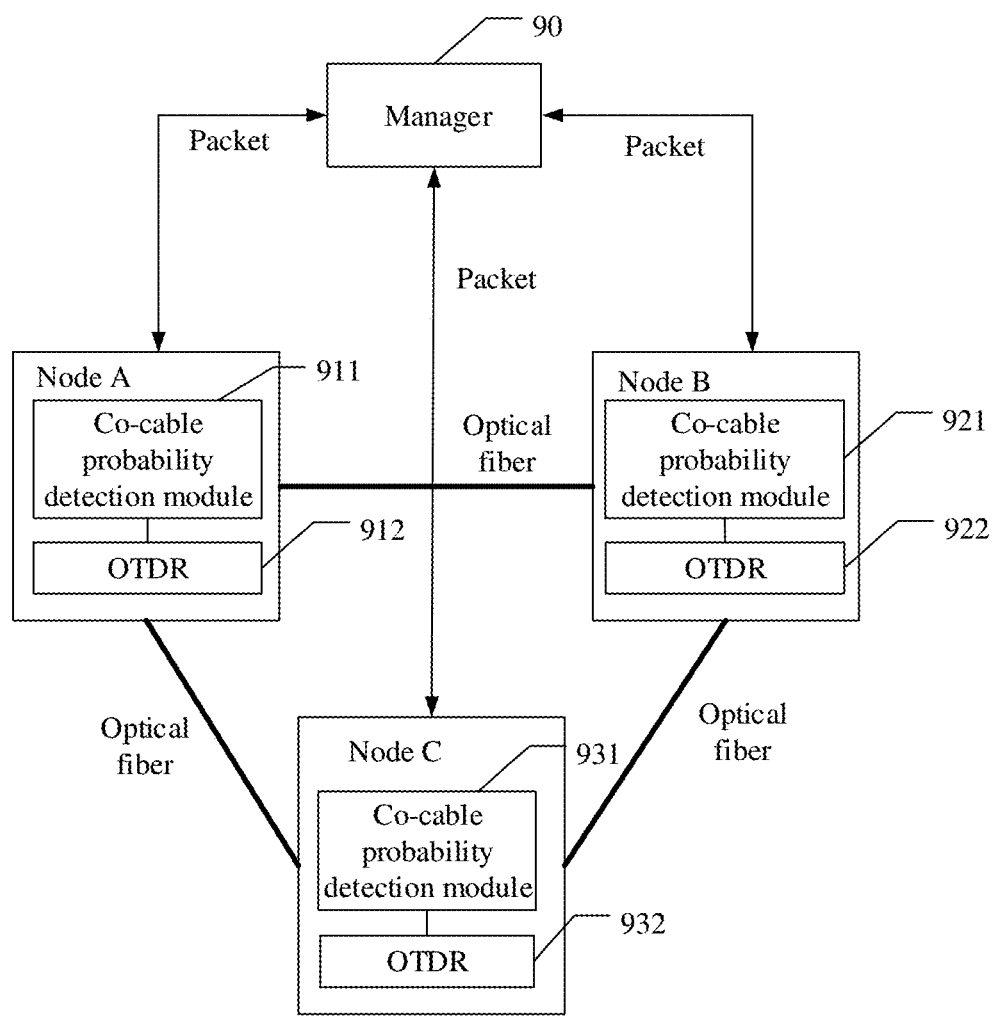
FIG. 9 is another schematic diagram of a scenario of calculating a co-cable probability according to this application.

For example, as shown in FIG. 8, a co-cable probability detection module 801 and an OTDR 802 are disposed in a controller 80. The co-cable probability detection module 801 is configured to perform step 502. For details, refer to related descriptions in the following step 502. Details are not described herein. The OTDR 802 includes but is not limited to an event identification module 8021, a data collection module 8022, and a probing module 8023. Similar to FIG. 7, the probing module 8023 in the OTDR 802 transmits an optical sounding signal to an optical fiber connected between a node A and a node B, and receives an echo signal returned from the optical fiber. The data collection module 8022 collects information about the echo signal, and an event type of each event and/or a location of the event in the optical fiber (or a distance between two adjacent events) that are/is identified by the event identification module 8021, and transmits the event information to the co-cable probability detection module 801. The co-cable probability detection module 801 performs step 502.

It can be understood that in the manner 2, a co-cable detection function may be implemented in a network element or a node in an optical communication network. For a corresponding network architecture, refer to FIG. 9. An OTDR and a co-cable probability detection module are disposed in each of a node A, a node B, and a node C. For example, a co-cable probability detection module 911 and an OTDR 912 are disposed in the node A, a co-cable probability detection module 921 and an OTDR 922 are disposed in the node B, and a co-cable probability detection module 931 and an OTDR 932 are disposed in the node C. Certainly, only three nodes are used as an example for description herein, and do not be construed as any limitation. A quantity of nodes may be adjusted depending on an actual application scenario. For functions of the node A, the node B, and the node C, refer to FIG. 8. Details are not described herein again. It should be understood that a manager 90 herein may be a management device in the optical communication network, for example, a network management system. The node A, the node B, and the node C send, to the manager 90 in forms of packets, co-cable probabilities that are between optical fibers and that are detected by the node A, the node B, and the node C. The manager 90 manages the co-cable probabilities between the optical fibers in the optical communication network together.

In a possible implementation, multiplexing (for example, wavelength division multiplexing or time division multiplexing) may be performed between an optical sounding signal sent by an OTDR and a service signal transmitted in an optical fiber, so that service data can also be normally transmitted during co-cable probability detection, thereby improving data transmission efficiency.

In a possible implementation, before step 501 is performed, transmission media in the communication network may be preliminarily screened, to screen a plurality of transmission media that satisfy a preliminary screening condition. Specifically, if the transmission medium is an optical fiber, the preliminary screening condition may include but is not limited to one or more of the following, including wo optical fibers are used to establish active/standby paths for transmitting data of a same service, that is, the two optical fibers have a same source node and/or a same sink node, two optical fibers are two optical fibers in a preset risk group, where the preset risk group includes a plurality of transmission media whose detected probability of sharing a cable segment is greater than a preset probability, or two transmission media are located in one subnet, where the communication network may generally include a plurality of subnets. For example, one municipal optical fiber may form one subnet, a plurality of municipal subnets form a complete optical communication network, and the first transmission medium and the second transmission medium may be optical fibers in one municipal subnet.

In a possible implementation, step 501 may be triggered by a user, or may be triggered after the controller detects that a transmission medium changes.

If step 501 is triggered by a user, before step 501 is performed, the method may further include receiving user-specified information, where the user-specified information may include identifiers of transmission media whose probability of sharing a cable segment needs to be detected, and trigger, based on the user-specified information, to obtain information about events in the transmission media whose probability of sharing a cable segment needs to be detected. For example, an optical fiber in the optical communication network has a unique identifier, and the user may specify optical fibers whose co-cable probability needs to be detected. The user-specified information carries identifiers of the optical fibers whose co-cable probability needs to be detected.

If step 501 is triggered after the network manager, a network element, or the like in the communication system detects that a transmission medium changes, before step 501 is performed, the method may further include if detecting that the first transmission medium or the second transmission medium is a newly added transmission medium, or if detecting that a fault occurs on a service path on the first transmission medium or the second transmission medium, performing the co-cable probability detection method in this embodiment of this application. A condition for determining that a fault occurs on a service path may include but is not limited to data transmitted in the first transmission medium or the second transmission medium is interrupted, a sudden change in attenuation of data transmitted in the first transmission medium or the second transmission medium exceeds a threshold, or a sudden change occurs in a delay of data transmitted in the first transmission medium or the second transmission medium. An identifier of a transmission medium on which a fault occurs is then obtained, and obtaining of information about events in the transmission medium on which the fault occurs is triggered. For example, if the node A detects that one or more optical fibers are newly added, a delay change in transmitting data in the optical fiber connected to the node A exceeds a delay threshold, an attenuation change exceeds a threshold, or transmission interruption or another transmission fault occurs, it is determined that a fault occurs on the optical fiber for transmitting data. Then, obtaining of information about events in the optical fiber on which the fault occurs is triggered. When a fault occurs on a service path, rerouting needs to be performed to perform service restoration. In this case, co-cable probability detection can prevent a rerouting path and the faulty path from passing through a co-cable, thereby improving a rerouting success rate.

502: Calculate, based on the information about the at least two first events and the information about the at least two second events a probability that the first transmission medium and the second transmission medium share a cable segment.

After the information about the at least two first events on the first transmission medium and the information about the at least two second events on the second transmission medium are obtained, the probability that a shared cable segment exists between the first transmission medium and the second transmission medium is calculated based on the information about the at least two first events and the information about the at least two second events.

It should be noted that only two transmission media are used as an example for description in this application. Actually, co-cable probabilities between more transmission media may be calculated, and a calculation manner is similar to that of the two transmission media. Specifically, an adjustment may be made depending on an actual application scenario. This is not limited in this application.

For ease of understanding, a probability that a shared cable segment exists between two transmission media is referred to as a co-cable probability below. An example is used for description in which the transmission medium is an optical fiber. The following optical fiber may be replaced with a twisted pair, a coaxial cable, or the like.

In the following implementations of this application, a co-cable probability is calculated in a plurality of manners, and each of the plurality of manners may be independently used to calculate a co-cable probability or the plurality of manners may be mutually combined to calculate a co-cable probability. The following separately describes the calculation manners.

Manner 1: Calculate a Co-Cable Probability Based on a Distance Between Adjacent Events (or Referred to as Event Occurrence Points).

Figure 10:
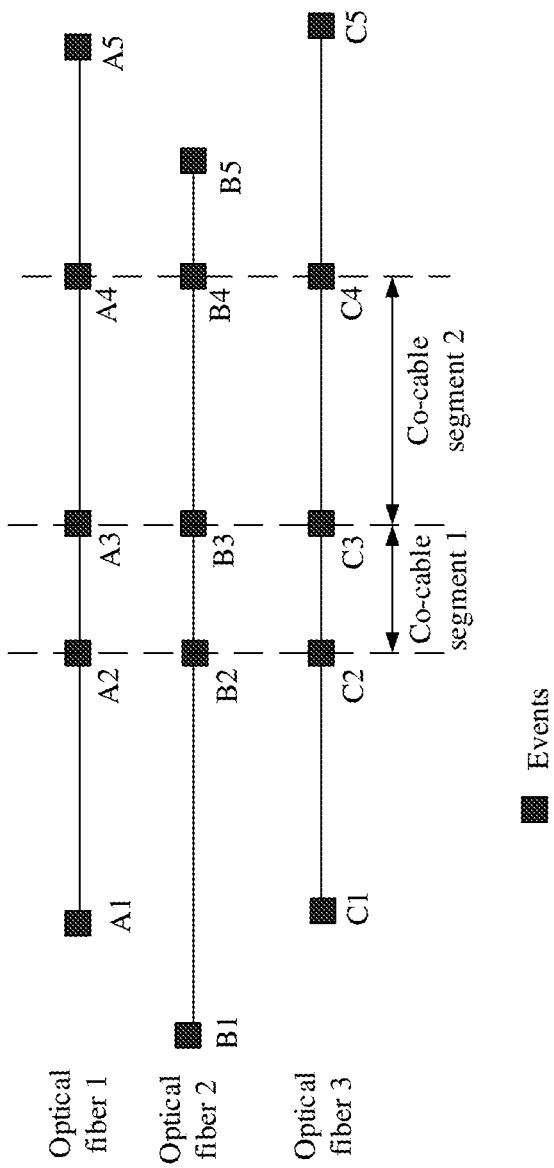

In a possible implementation, step 502 may include event information carries distances between events and an optical fiber head end of an optical sounding signal, a distance between two adjacent events in each optical fiber may be calculated based on a distance between an event in the optical fiber and the optical fiber head end of the optical sounding signal, and then a distance between two events in one of any two optical fibers is matched with a distance between two events in the other optical fiber, to calculate a probability that a shared cable segment exists between the any two optical fibers. For example, as shown in FIG. 10, a distance between two adjacent events in each of optical fibers, namely, an optical fiber 1, an optical fiber 2, and an optical fiber 3, is matched with a distance between two adjacent events in another optical fiber in the three optical fibers, and a probability that a shared optical cable segment exists between the optical fiber 1, the optical fiber 2, and the optical fiber 3 is calculated based on a matching result. For example, a distance between events A2 and A3 in the optical fiber 1, a distance between events B2 and B3 in the optical fiber 2, and a distance between events C2 and C3 in the optical fiber 3 are similar, and co-cable probabilities between the optical fiber 1, the optical fiber 2, and the optical fiber 3, that is, probabilities of sharing an optical cable segment by the optical fiber 1, the optical fiber 2, and the optical fiber 3, may be generated based on similarities. In addition, closer similarities between the distance between the events A2 and A3 in the optical fiber 1, the distance between the events B2 and B3 in the optical fiber 2, and the distance between the events C2 and C3 in the optical fiber 3 lead to larger calculated co-cable probability values.

It can be understood that an optical cable between two adjacent events may be one optical cable segment, and a distance between two adjacent events can be understood as a length of one optical cable segment. Therefore, a length of an optical cable segment on the first optical fiber is matched with a length of an optical cable segment on the second optical fiber, to calculate a co-cable probability between the first optical fiber and the second optical fiber.

For example, in the foregoing implementation or the following implementation, a specific co-cable probability calculation manner may include determining a difference between a length of an optical cable segment on one of two optical fibers and a length of an optical cable segment on the other optical fiber, and if the length difference is within three times a standard variance, calculating an area in an integral method based on a location of the length difference in a normal distribution. In this way, a probability that the optical cable segment on one of the two optical fibers and the optical cable segment on the other optical fiber are a shared optical cable segment can be obtained. Then, weighting calculation may be performed on probabilities that an optical cable segment is a shared optical cable segment, to calculate a probability that a shared optical cable segment exists between the two optical fibers. In addition, a larger quantity of optical cable segments with similar lengths indicates a higher calculated co-cable probability between the two optical fibers.

When a distance between two adjacent events in each optical fiber is calculated, a distance between adjacent events in each optical fiber may be calculated, or a distance between adjacent major events may be calculated. The major events may indicate that a confidence level of a cable segment is greater than or equal to a first preset threshold. The first preset threshold may be adjusted depending on an actual application. This is not limited herein. The major event may be further an event in which a reflection height is greater than a preset height, a loss value is greater than a preset loss value, a negative gain is greater than a preset gain value, or the like. Then, a co-cable probability between two optical fibers is calculated based on the distance between the two adjacent major events in each optical fiber. For example, an event in which the reflection height is greater than 0.3 dB or the attenuation value is greater than 0.2 dB among events in each optical fiber may be used as a major event.

In a specific implementation, a distance between any two adjacent events in one of two optical fibers may be matched with a distance between any two adjacent events in the other optical fiber in a traversal manner, to obtain a co-cable probability between the two optical fibers. Alternatively, if there is no major event in two optical fibers, a distance between any two adjacent events in one of the two optical fibers may be matched with a distance between any two adjacent events in the other optical fiber in a traversal manner, to calculate a co-cable probability between the two optical fibers.

Figure 11:
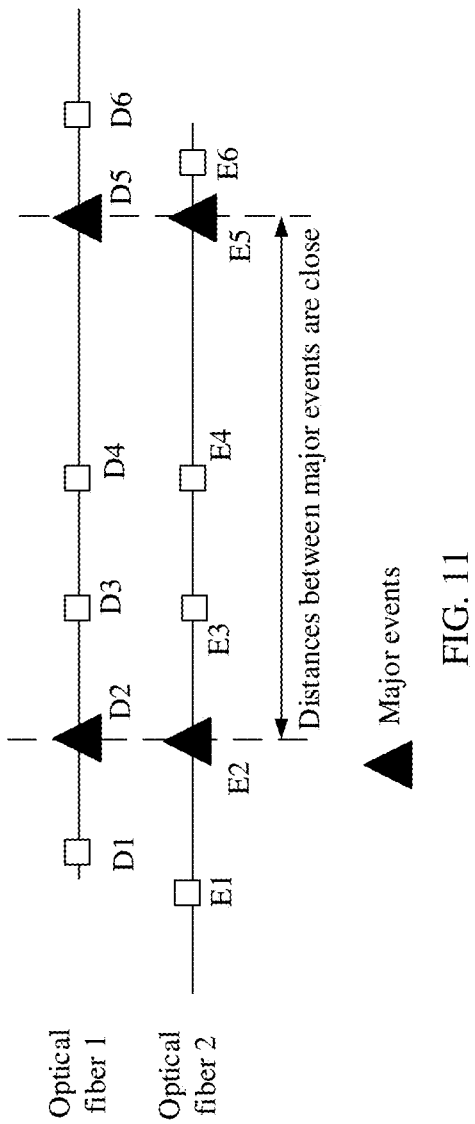
FIG. 11 is another schematic diagram of a manner of calculating a co-cable probability according to this application.

In another specific implementation, a distance between any two adjacent major events in one of two optical fibers may be matched with a distance between any two adjacent major events in the other optical fiber, to obtain a major-event similarity. Then, a co-cable probability between the two optical fibers is calculated based on major-event similarities, for example, by performing weighting calculation or a sum operation. Alternatively, when there are only two major events in one optical fiber, the major-event similarity is used as a co-cable probability, or the like. In addition, a smaller length difference between two adjacent major events indicates a higher similarity. Generally, there may be an error in a distance between two events, for example, an OTDR measurement error, or an error caused by different twist rates of different optical fibers in one optical cable or different fiber coiling lengths in a fiber splicing box. A major event can be understood as an event with a high confidence level, and generally missed detection does not easily occur on the major event. Therefore, accuracy of the co-cable probability obtained based on the major-event similarity is also higher. For example, as shown in FIG. 11, major events D2 and D5 in an optical fiber 1 and major events E2 and E5 in an optical fiber 2 are screened, and a difference between a distance between D2 and D5 and a distance between E2 and E5 is calculated. A smaller distance difference between the major events in the two optical fibers, that is, closer or equal distances between the major events in the two optical fibers, leads to a higher obtained major-event similarity, and a higher co-cable probability is obtained accordingly.

In another specific implementation, a distance between any two adjacent minor events in one of two optical fibers may be matched with a distance between any two adjacent minor events in the other optical fiber, to obtain a minor-event similarity. Then, a co-cable probability between the two optical fibers is calculated based on the minor-event similarity. The minor events are events whose confidence levels are less than or equal to a second preset threshold. The second preset threshold may be adjusted depending on an actual application scenario. This is not limited herein. For example, a difference between a distance between two adjacent minor events in the optical fiber 1 and a distance between two adjacent minor events in the optical fiber 2 may be calculated. Then, the difference is calculated to obtain the minor-event similarity. A specific minor-event similarity calculation manner may be if the difference is within three times a standard variance, calculating an area in an integral method based on a location of the difference in a normal distribution, and using the area as the minor-event similarity. Then, weighting calculation is performed on a plurality of minor-event similarities between the two optical fibers, to obtain a co-cable probability that the two optical fibers share an optical cable segment.

Specifically, the minor event may be further an event in which a reflection height is not greater than the preset height, a loss value is not greater than the preset loss value, a negative gain is not greater than the preset gain value, or the like. Then, the co-cable probability between the two optical fibers is calculated based on the distance between the minor events in each optical fiber. For example, an event in which the reflection height is less than or equal to 0.3 dB or the attenuation value is less than or equal to 0.2 dB among events in each optical fiber may be used as a minor event.

Figure 12:
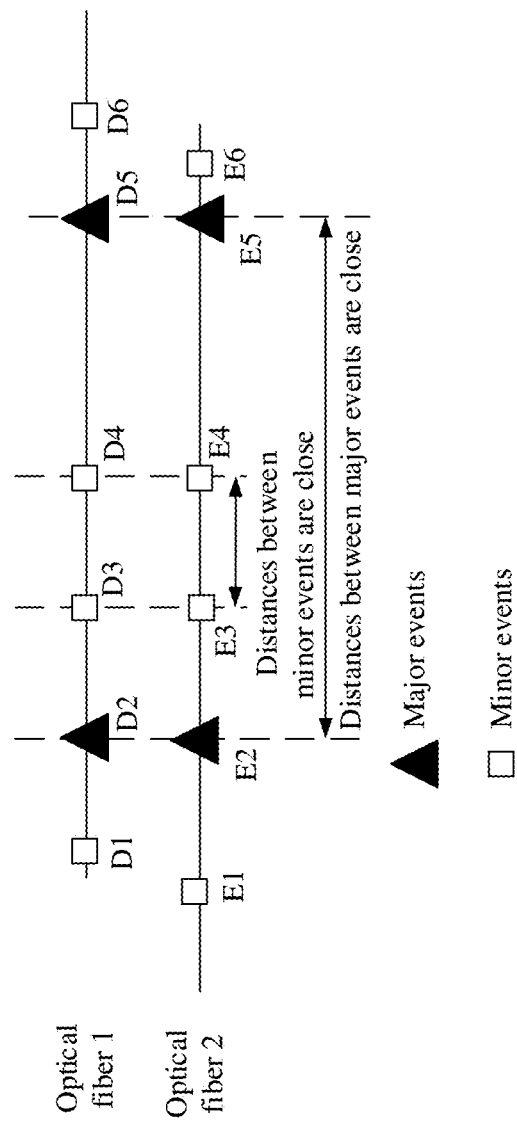
FIG. 12 is another schematic diagram of a manner of calculating a co-cable probability according to this application.

In a more specific implementation, on a basis of calculating the co-cable probability based on the major-event similarity, a more precise co-cable probability may be further calculated with reference to the minor-event similarity. A distance between two adjacent minor events in one of two optical fibers may be matched with a distance between two adjacent minor events in the other optical fiber, to obtain a minor-event similarity. A final co-cable probability is calculated with reference to the major-event similarity and the minor-event similarity. Specifically, different weight values may be set based on the major-event similarity and the minor-event similarity. A higher similarity indicates a larger weight value, and a weight value corresponding to a major event is greater than a weight value corresponding to a minor event. Then, weighting calculation is performed on the major-event similarity and the minor-event similarity based on the weight value corresponding to the major event and the weight value corresponding to the minor event, to obtain a more precise co-cable probability. For example, as shown in FIG. 12, major events in an optical fiber 1 include D2 and D5, minor events in the optical fiber 1 include D1, D3, D4, and D6, major events in an optical fiber 2 include E2 and E5, and minor events in the optical fiber 2 include E1, E3, E4, and E6. A difference between a distance between D2 and D5 and a distance between E2 and E5 is calculated, and a major-event similarity is obtained based on the difference. A smaller distance difference leads to a higher obtained major-event similarity. Then, a minor-event similarity between the two major events is calculated to improve accuracy of a co-cable probability. A difference between a distance between D3 and D4 and a distance between E3 and E4 is calculated to obtain the minor-event similarity, and then weighting calculation is performed on the major-event similarity and the minor-event similarity, to obtain a co-cable probability between the optical fiber 1 and the optical fiber 2. In addition, to further improve accuracy and efficiency of calculating the co-cable probability, the similarity between the two adjacent minor events located between the two major events may be calculated only when the calculated major-event similarity is greater than a similarity threshold, thereby avoiding meaningless calculation. The similarity threshold may be adjusted depending on an actual application scenario, and a larger similarity threshold leads to higher efficiency of calculating a co-cable probability. Moreover, in addition to matching the distance between the two adjacent minor events in one of the two optical fibers with the distance between the two adjacent minor events in the other optical fiber, a distance between a minor event and a major event in one of the two optical fibers may be further matched with a distance between a minor event and a major event in the other optical fiber. In FIG. 12, during calculation of the minor-event similarity, a difference between a distance between D2 and D3 and a distance between E2 and E3 and a difference between a distance between D4 and D5 and a distance between E4 and E5 are also calculated. This increases a value of the minor-event similarity, so that the co-cable probability obtained through subsequent weighting calculation is more precise.

Manner 2: Calculate a Co-Cable Probability in a Same Source or Same Sink Scenario.

In a specific scenario, the first optical fiber and the second optical fiber may include a same event, the same event is used as a reference event, and the reference event is an event generated by a first sounding signal and a second sounding signal at a same optical cable location. Then, a distance between an event in the first optical fiber and the reference event and a distance between an event in the second optical fiber and the reference event are separately calculated, and the distance between the event in the first optical fiber and the reference event is matched with the distance between the event in the second optical fiber and the reference event, to obtain a co-cable probability between the two optical fibers. If optical fiber head ends of the first optical sounding signal and the second optical sounding signal are the same, the reference event may be the optical fiber head end of the first optical sounding signal and the second optical sounding signal. If optical fiber tail ends of the first optical sounding signal and the second optical sounding signal are the same, the reference event may be the optical fiber tail end of the first optical sounding signal and the second optical sounding signal. The reference event may be alternatively generated by an endpoint of an optical cable segment. The optical cable segment may be one endpoint of a manually identified co-cable segment on the first optical fiber and the second optical fiber.

Further, the distance between the event in the first optical fiber and the reference event may be matched with the distance between the event in the second optical fiber and the reference event, to obtain at least one event similarity, and the probability that the at least one cable segment on the first transmission medium and the at least one cable segment on the second transmission medium include a co-cable segment is calculated based on the at least one event similarity.

For example, if source nodes (namely, the optical fiber head ends) or sink nodes (namely, the optical fiber tail ends) for sending the optical sounding signals in the two optical fibers are the same, the co-cable probability may be calculated in the second manner, or on a basis of the foregoing manner 1, the co-cable probability is updated more accurately with reference to this manner, to obtain a more precise co-cable probability.

Specifically, if the two optical fibers have a same source or a same sink, that is, if the source nodes or the sink nodes for sending the optical sounding signals in the two optical fibers are the same, distances between events in the two optical fibers and a same node (namely, the reference event) are calculated, the distance between the events in one of the two optical fibers and the same node is matched with the distance between the events in the other optical fiber and the same node, to obtain the at least one event similarity, and an operation, for example, weighting calculation or a sum operation, is performed on the at least one event similarity, to obtain the co-cable probability between the two optical fibers. A higher similarity between the distances between the events in the two optical fibers and the same node indicates a higher finally obtained co-cable probability. The same node may be a node common to the two optical fibers, and may be a same source node or a same sink node. When the two optical fibers are corresponding to both a same source node and a same sink node, the same node may be either the source node or the sink node.

More specifically, a scenario in which the two optical fibers have a same source and a same sink is used as an example. Any two adjacent events in an optical fiber 1 are determined as a start event 1 and an end event 1, where the start event 1 and the end event 1 can be understood as two ends of an optical cable segment on the optical fiber 1. Any two adjacent events in an optical fiber 2 are determined as a start event 2 and an end event 2, where the start event 2 and the end event 2 can be understood as two ends of an optical cable segment on the optical fiber 2. Distances between the start event 1 and a source node of the optical sounding signal and between the end event 1 and the source node, and distances between the start event 2 and the source node and between the end event 2 and the source node are calculated. Then, a start event difference between the distance between the start event 1 and the source node and the distance between the start event 2 and the source node is calculated, and a start event similarity is calculated based on the start event difference. A smaller start event difference indicates a higher start event similarity. In addition, an end event difference between the distance between the end event 1 and the source node and the distance between the end event 2 and the source node is calculated, and an end event similarity is calculated based on the end event difference. A smaller end event difference indicates a higher end event similarity. Then, a probability that an optical cable segment between the start event 1 and the end event 1 and an optical cable segment between the start event 2 and the end event 2 are a same optical cable segment is calculated based on the start event similarity and the end event similarity. Afterwards, weighting calculation is performed on a probability that one or more optical cable segments on the optical fiber 1 and one or more optical cable segments on the optical fiber 2 are a co-cable segment, to obtain a co-cable probability between the optical fiber 1 and the optical fiber 2. It can be understood that if both the start event similarity and the end event similarity of one optical cable segment are higher than a specified threshold, that is, if locations of the start events in the two optical fibers are similar in the optical fibers and locations of the end events in the two optical fibers are similar in the optical fibers, a length of the optical cable segment between the start event and the end event in one of the two optical fibers is also similar to a length of the optical cable segment between the start event and the end event in the other optical fiber. In other words, the optical cable segments between the start events and the end events in the two optical fibers may be a same optical cable segment. Specifically, a probability that the optical cable segments corresponding to the start events and the end events in the two optical fibers are a same optical cable segment may be calculated based on the start event similarity and the end event similarity by using a preset mapping formula. In this way, the co-cable probability between the two optical fibers is obtained based on the probability that the optical cable segments corresponding to the start events and the end events are a same optical cable segment. The preset mapping formula may be adjusted depending on an actual application scenario, for example, may be p=f(x, y). f is the mapping formula, p is the probability that the optical cable segments corresponding to the start events and the end events are a same optical cable segment, and x and y are the start event similarity and the end event similarity. The greater x and y, the greater the obtained p is.

Moreover, when a start event and an end event in one optical fiber are determined, two adjacent major events may be selected as the start event and the end event, two adjacent minor events may be selected as the start event and the end event, or any two adjacent events may be selected as the start event and the end event. Specifically, an adjustment may be made depending on an actual application scenario.

Figure 13:
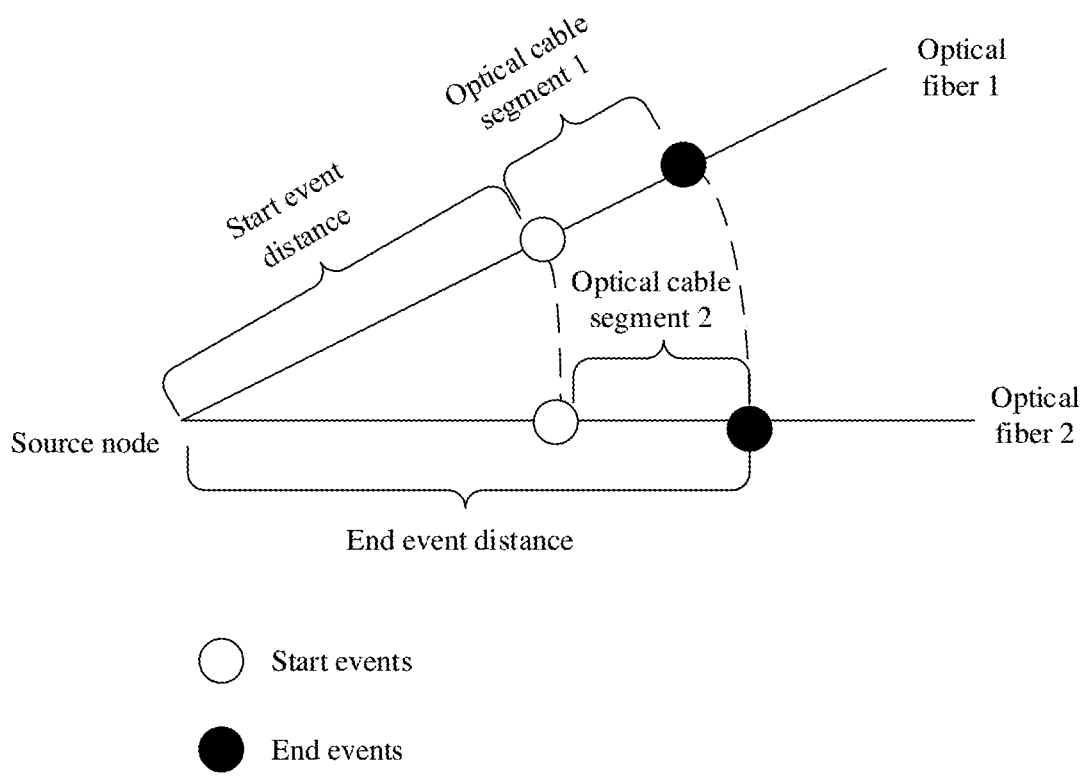
FIG. 13 is another schematic diagram of a manner of calculating a co-cable probability according to this application.

For example, as shown in FIG. 13, an optical fiber 1 and an optical fiber 2 have a same source, that is, head ends of the optical fiber 1 and the optical fiber 2 are the same. Two adjacent events are selected as a start event and an end event separately in the optical fiber 1 and the optical fiber 2. A distance between the start event and the optical fiber head end and a distance between the end event and the optical fiber head end in the optical fiber 1 are calculated, and a distance between the start event and the optical fiber head end and a distance between the end event and the optical fiber head end in the optical fiber 2 are calculated. Then, a difference between the start event distance of the optical fiber 1 and the start event distance of the optical fiber 2 is calculated, and a smaller difference indicates a higher start event similarity. In addition, a difference between the end event distance of the optical fiber 1 and the end event distance of the optical fiber 2 is calculated, and a smaller difference also indicates a higher end event similarity. Afterwards, a start event similarity is calculated based on the difference between the start event distances, and an end event similarity is calculated based on the difference between the end event distances. For calculation manners, refer to the foregoing calculation manners of the major-event similarity and the minor-event similarity. Next, a probability that optical cable segments between the start events and the end events in the two optical fibers are a same optical cable segment is calculated based on the start event similarity and the end event similarity. The probability that the optical cable segments between the start events and the end events in the two optical fibers are a same optical cable segment may be used as a co-cable probability between the two optical fibers. Alternatively, if probabilities that a plurality of optical cable segments corresponding to a plurality of pairs of start events and end events in the two optical fibers are a same optical cable segment are calculated, weighting calculation may be performed on the probabilities that the plurality of optical cable segments are a same optical cable segment, to obtain a co-cable probability between the two optical fibers. For a specific weighting calculation manner, refer to the foregoing manner 1. For the two optical fibers shown in FIG. 13, that the start event similarity and the end event similarity are high may mean that a location of the start event in the optical fiber 1 is similar to a location of the start event in the optical fiber 2, and a location of the end event in the optical fiber 1 is similar to a location of the end event in the optical fiber 2. In this case, a length of an optical cable segment 1 between the start event and the end event in the optical fiber 1 is also similar to a length of an optical cable segment 2 between the start event and the end event in the optical fiber 2. In other words, the optical cable segment 1 and the optical cable segment 2 may be a same optical cable segment. Therefore, the co-cable probability calculation manner in a same source or same sink scenario is provided in the second manner, to precisely calculate the co-cable probability between the two optical fibers.

It should be understood that a scenario in which the two optical fibers have a same sink is similar to the foregoing scenario in which the two optical fibers have a same source, provided that source nodes in this scenario are replaced with sink nodes. For example, source nodes in the optical fiber 1 and the optical fiber 2 in FIG. 13 may be replaced with sink nodes. Details are not described herein.

In addition, if the co-cable probability is calculated in the manner 1 and the manner 2 jointly, a probability that any two optical cable segments between the two optical fibers are a co-cable segment may be calculated in the manner 1, and a start event difference and an end event difference in the two optical fibers may be calculated in the manner 2. Then, different weight values are selected for the optical cable segments between the start events and the end events in the two optical fibers based on the start event difference and the end event difference. A smaller start event difference or end event difference indicates a larger weight value, or a closer distance between the start event or the end event and the source node indicates a larger weight value. Afterwards, weighting calculation is performed on the probability that the any two optical cable segments are a co-cable segment and that is calculated in the manner 1 and the weight values of the optical cable segments calculated in the manner 2, to obtain the co-cable probability between the two optical fibers. Therefore, on a basis of calculating the probability that the optical cable segments are a shared optical cable segment based on the distance between the adjacent events, and the co-cable probability between the two optical fibers is calculated more precisely with reference to the distance between each event in the same source or the same sink and the source node.

In a possible implementation, in addition to the co-cable probability calculation manners in the manner 1 and the manner 2, a co-cable probability may be further calculated with reference to types of events in the two transmission media. For example, whether types of two events in one of the two optical fibers match types of two events in the other optical fiber is determined. If the types of the two events in the optical fiber 1 are splice points, and the types of the two events in the optical fiber 2 that match those in the optical fiber 1 are movable connectors, a matching degree of the types of the two events in the optical fiber 1 and the optical fiber 2 is low, and accordingly the obtained co-cable probability is also low. In contrast, if the types of the two events in the optical fiber 1 are splice points, and the types of the two events in the optical fiber 2 that match those in the optical fiber 1 are also splice points, a matching degree of the types of the two events in the optical fiber 1 and the optical fiber 2 is high, and accordingly the obtained co-cable probability is also high. For example, a weight value may be allocated for similarity matching between two adjacent events in the two optical fibers based on types of the events in the two optical fibers. If the two events that are in the two optical fibers and that are used for matching have a same type or similar characteristics, a weight value is larger. If the two events that are in the two optical fibers and that are used for matching have different types or differ greatly in characteristics, a weight value is smaller. Subsequently, weighting calculation may be performed on a similarity between the events in the two optical fibers based on the weight value, to obtain the co-cable probability between the two optical fibers.

Moreover, the types of the events in one of the two optical fibers may be further matched with the types of the events in the other optical fiber, to calculate the co-cable probability between the two optical fibers. For example, it is assumed that the events in the optical fiber 1 sequentially include an optical fiber head end, a movable connector, a mechanical connector, bending, bending, bending, a splice point, and an optical fiber tail end, and the events in the optical fiber 2 sequentially include an optical fiber head end, a mechanical connector, bending, bending, bending, a splice point, a movable connector, a splice point, and an optical fiber tail end. The types of the events in the optical fiber 1 may be matched with the types of the events in the optical fiber 2. In this case, types and a sorting order of events, namely, the mechanical connector, bending, bending, bending, and the splice point, in the optical fiber 1 have high similarities with those of events, namely, the mechanical connector, bending, bending, bending, and the splice point, in the optical fiber 2. Then, a probability that optical cable segments corresponding to the mentioned events in the optical fiber 1 and the optical fiber 2 are a same optical cable segment may be calculated based on a similarity of each event, a quantity of consecutive similar events, and the like. It can be understood that the optical cable segments between the events in the optical fiber 1 that have a high type similarity with those in the optical fiber 2 may be a same optical cable segment.

In a possible implementation, after the co-cable probability between the two transmission media is calculated, that is, after step 502 is performed, if the co-cable probability is higher than a warning threshold, co-cable risk warning information is generated, and warning is issued based on the co-cable warning information. For example, if the co-cable probability between the two optical fibers is higher than 80%, it indicates that there is a high probability that a co-cable segment exists between the two optical fibers. In this case, the co-cable risk warning information may be generated, and the co-cable risk warning information may be displayed on a display interface, to inform a user that the probability that a co-cable segment exists between the two optical fibers is higher than 80%. In this way, an optical fiber for transmitting data is replaced in a timely manner for a device using the two optical fibers, or optical cable laying is adjusted, or the like.

In a possible implementation, after co-cable probabilities between transmission media in the communication network are detected, transmission media whose co-cable probability is higher than the warning threshold may be screened, and then a co-cable risk group, namely, the foregoing preset risk group, may be generated based on information about the transmission media whose co-cable probability is higher than the warning threshold. In this way, the transmission media at a co-cable risk in the communication network can be warned in a timely manner, to make a corresponding adjustment. This avoids sharing a cable segment by an active path and a standby path between devices, thereby providing stability of data transmission between the devices.

In this implementation of this application, the co-cable probability between the two transmission media may be calculated based on the detected information about the events in the two transmission media. Therefore, labor costs caused by maintenance of manual recording can be avoided, errors of manually recorded information can be reduced, and the co-cable probability between the two transmission media can be detected in a timely manner, to avoid a co-cable risk due to a failure in timely manual recording.

The foregoing describes the procedure for the co-cable probability detection method provided in this application. Based on the co-cable probability detection method, the following details apparatuses provided in this application.

Figure 14:
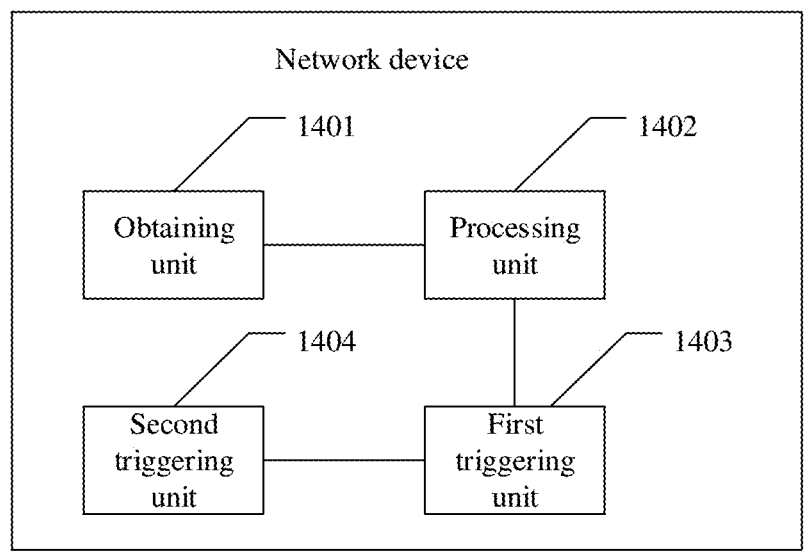
FIG. 14 is a schematic diagram of a structure of a network device according to this application.

FIG. 14 is a schematic diagram of a structure of a network device according to this application. The network device may include an obtaining unit 1401, configured to obtain information about at least two first events and information about at least two second events, where the information about the at least two first events is obtained based on a first sounding signal transmitted in a first transmission medium, the information about the at least two second events is obtained based on a second sounding signal transmitted in a second transmission medium, the information about the at least two first events indicates at least one cable segment on the first transmission medium, and the information about the at least two second events indicates at least one cable segment on the second transmission medium, the obtaining unit 1401 may obtain the event information according to any manner in step 501 in the embodiment in FIG. 5, and a processing unit 1402, configured to obtain, based on the information about the at least two first events and the information about the at least two second events, a probability that the at least one cable segment on the first transmission medium and the at least one cable segment on the second transmission medium include a co-cable segment, where the co-cable segment is a cable segment shared by the first transmission medium and the second transmission medium, the processing unit 1402 may calculate, according to any manner in step 502 in the embodiment in FIG. 5, the probability that the at least one cable segment on the first transmission medium and the at least one cable segment on the second transmission medium include a co-cable segment.

In a possible implementation, the processing unit 1402 is specifically configured to determine a distance between two adjacent first events in the first transmission medium and a distance between two adjacent second events in the second transmission medium, and match a distance between any two adjacent first events in the first transmission medium with a distance between any two adjacent second events in the second transmission medium, to obtain the probability that the at least one cable segment on the first transmission medium and the at least one cable segment on the second transmission medium include a co-cable segment.

In a possible implementation, the at least two first events and the at least two second events include major events, and the major events indicate that a confidence level of a cable segment is greater than or equal to a first preset threshold, and the processing unit 1402 may be specifically configured to match a distance between any two adjacent major events included in the first transmission medium with a distance between any two adjacent major events included in the second transmission medium, to obtain a major-event similarity, and calculate, based on the major-event similarity, the probability that the at least one cable segment on the first transmission medium and the at least one cable segment on the second transmission medium include a co-cable segment.

In a possible implementation, the at least two first events and the at least two second events include minor events, and the minor events indicate that a confidence level of a cable segment is less than or equal to a second preset threshold. The processing unit 1402 is configured to match a distance between any two adjacent minor events included in the first transmission medium with a distance between any two adjacent minor events included in the second transmission medium, to obtain a minor-event similarity, and calculate, based on the minor-event similarity, the probability that the at least one cable segment on the first transmission medium and the at least one cable segment on the second transmission medium include a co-cable segment.

In a possible implementation, the at least two first events and the at least two second events include a reference event, and the reference event is an event generated by the first sounding signal and the second sounding signal at a same cable location. The processing unit 1402 is further configured to match a distance between at least one first event in the first transmission medium and the reference event with a distance between at least one second event in the second transmission medium and the reference event, to obtain the probability that the at least one cable segment on the first transmission medium and the at least one cable segment on the second transmission medium include a co-cable segment.

In a possible implementation, the processing unit 1402 is specifically configured to match the distance between the at least one first event in the first transmission medium and the reference event with the distance between the at least one second event in the second transmission medium and the reference event, to obtain at least one event similarity, and calculate, based on the at least one event similarity, the probability that the at least one cable segment on the first transmission medium and the at least one cable segment on the second transmission medium include a co-cable segment.

In a possible implementation, the processing unit 1402 is further configured to calculate, based on event types of the at least two first events and event types of the at least two second events, the probability that the at least one cable segment on the first transmission medium and the at least one cable segment on the second transmission medium include a co-cable segment.

In a possible implementation, the network device further includes a first triggering unit 1403, configured to receive user-specified information, and trigger, based on the user-specified information, the obtaining unit 1401 to obtain the information about the at least two first events and the information about the at least two second events, where the user-specified information includes an identifier of the first transmission medium and an identifier of the second transmission medium.

In a possible implementation, the network device further includes a second triggering unit 1404, configured to before the obtaining unit 1401 obtains the information about the at least two first events and the information about the at least two second events, detect that the first transmission medium or the second transmission medium is a newly added transmission medium, or detect that a fault occurs on a service path on the first transmission medium or the second transmission medium.

In a possible implementation, the processing unit 1402 is further configured to after obtaining the probability that the at least one cable segment on the first transmission medium and the at least one cable segment on the second transmission medium include a co-cable segment, if the probability that the at least one cable segment on the first transmission medium and the at least one cable segment on the second transmission medium include a co-cable segment is greater than a warning threshold, generate co-cable risk warning information, where the co-cable risk warning information is used to warn that a shared cable segment exists between the first transmission medium and the second transmission medium.

In a possible implementation, the first transmission medium and the second transmission medium satisfy one or more of the following, including service paths to be established on the first transmission medium and the second transmission medium are active/standby paths, or the first transmission medium and the second transmission medium are two transmission media in a preset risk group, where the preset risk group includes at least one pair of transmission media whose probability of sharing a cable segment is greater than a preset probability.

In a possible implementation, the information about the at least two first events includes event types of the first events and/or locations of the first events on the first transmission medium, and the information about the at least two second events includes event types of the second events and/or locations of the second events on the second transmission medium.

Figure 15:
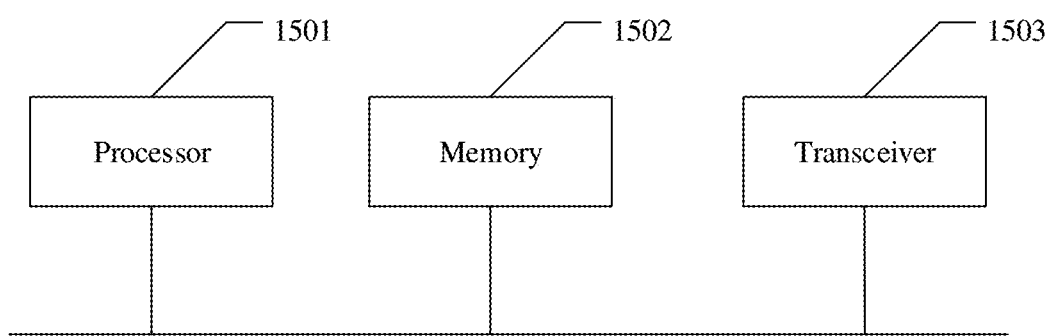
FIG. 15 is a schematic diagram of a structure of another network device according to this application.

FIG. 15 is a schematic diagram of a structure of a network device according to this application. The network device may include a processor 1501, a memory 1502, and a transceiver 1503. The processor 1501, the memory 1502, and the transceiver 1503 are interconnected through a line. The memory 1502 stores program instructions and data.

The memory 1502 stores program instructions and data that correspond to the steps performed by the network device in the foregoing implementations corresponding to FIG. 5 to FIG. 13.

The processor 1501 is configured to perform steps performed by the network device shown in any one of the embodiments in FIG. 5 to FIG. 13, and is specifically configured to perform step 502 in FIG. 5.

The transceiver 1503 may be configured to receive and send data, and is specifically configured to perform step 501 in FIG. 5.

Optionally, the transceiver 1503 may include an OTDR or a TDR, and is configured to collect information about events in transmission media.

An embodiment of this application further provides a digital processing chip. A circuit and one or more interfaces that are configured to implement functions of the processor 1501 are integrated into the digital processing chip. When a memory is integrated into the digital processing chip, the digital processing chip may complete the method steps in any one or more of the foregoing embodiments. When no memory is integrated into the digital processing chip, the digital processing chip may be connected to an external memory through an interface. The digital processing chip implements actions performed by the sending device or the receiving device in the foregoing embodiments based on program code stored in the external memory.

A person of ordinary skill in the art can understand that all or some of the steps of the foregoing embodiments may be implemented by hardware or by a program instructing related hardware. The program may be stored in a computer-readable storage medium. The foregoing storage medium may be a read-only memory, a random access memory, or the like. Specifically, for example, the foregoing processor may be a central processing unit, a general-purpose processor, a digital signal processor (DSP), an application-specific integrated circuit (ASIC), a field programmable gate array (FPGA) or another programmable logic device, a transistor logic device, a hardware component, or any combination thereof. Whether the functions are performed by hardware or software depends on particular applications and design constraints of the technical solutions. A person skilled in the art can use a different method to implement the described functions for each particular application, but it should not be considered that the implementation goes beyond the scope of this application.

When software is used to implement the embodiments, the method steps described in the foregoing embodiments may be implemented completely or partially in a form of a computer program product. The computer program product includes one or more computer instructions. When the computer program instructions are loaded and executed on a computer, the procedure or functions according to embodiments of this application are generated completely or partially. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium, or the like.

Finally, it should be noted that the foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A co-cable probability detection method, comprising:
   obtaining information about at least two first events and information about at least two second events, wherein the information about the at least two first events is obtained based on a first sounding signal transmitted in a first transmission medium, wherein the information about the at least two second events is obtained based on a second sounding signal transmitted in a second transmission medium, wherein the information about the at least two first events indicates at least one cable segment on the first transmission medium, and wherein the information about the at least two second events indicates at least one cable segment on the second transmission medium; and
   obtaining, based on the information about the at least two first events and the information about the at least two second events, a probability that the at least one cable segment on the first transmission medium and the at least one cable segment on the second transmission medium comprise a co-cable segment, wherein the co-cable segment is a cable segment shared by the first transmission medium and the second transmission medium.

2. The method according to claim 1, wherein the obtaining the probability that the at least one cable segment on the first transmission medium and the at least one cable segment on the second transmission medium comprise the co-cable segment comprises:
   determining a distance between two adjacent first events in the first transmission medium and a distance between two adjacent second events in the second transmission medium; and
   obtaining the probability that the at least one cable segment on the first transmission medium and the at least one cable segment on the second transmission medium comprise the co-cable segment by matching a distance between two adjacent first events in the first transmission medium with a distance between two adjacent second events in the second transmission medium.

3. The method according to claim 2, wherein the at least two first events and the at least two second events comprise major events, and wherein the major events indicate that a confidence level of a cable segment is greater than or equal to a first preset threshold; and
   wherein the obtaining the probability that the at least one cable segment on the first transmission medium and the at least one cable segment on the second transmission medium comprise the co-cable segment by matching the distance between two adjacent first events in the first transmission medium with the distance between two adjacent second events in the second transmission medium comprises:
   obtaining a major-event similarity by matching a distance between two adjacent major events in the first transmission medium with a distance between two adjacent major events in the second transmission medium; and
   calculating, based on the major-event similarity, the probability that the at least one cable segment on the first transmission medium and the at least one cable segment on the second transmission medium comprise the co-cable segment.

4. The method according to claim 2, wherein the at least two first events and the at least two second events comprise minor events, and wherein the minor events indicate that a confidence level of a cable segment is less than or equal to a second preset threshold; and
   wherein the obtaining the probability that the at least one cable segment on the first transmission medium and the at least one cable segment on the second transmission medium comprises the co-cable segment by matching the distance between two adjacent first events in the first transmission medium with the distance between two adjacent second events in the second transmission medium comprises:
   obtaining a minor-event similarity by matching a distance between two adjacent minor events in the first transmission medium with a distance between two adjacent minor events in the second transmission medium; and calculating, based on the minor-event similarity, the probability that the at least one cable segment on the first transmission medium and the at least one cable segment on the second transmission medium comprise the co-cable segment.

5. The method according to claim 1, wherein the obtaining the probability that the at least one cable segment on the first transmission medium and the at least one cable segment on the second transmission medium comprise the co-cable segment comprises:

calculating, based on event types of the at least two first events and event types of the at least two second events, the probability that the at least one cable segment on the first transmission medium and the at least one cable segment on the second transmission medium comprise the co-cable segment.

6. The method according to claim 1, wherein the at least two first events and the at least two second events comprise a reference event, and wherein the reference event is an event generated by the first sounding signal and the second sounding signal at a same cable location; and wherein the obtaining the probability that the at least one cable segment on the first transmission medium and the at least one cable segment on the second transmission medium comprise the co-cable segment comprises:

obtaining the probability that the at least one cable segment on the first transmission medium and the at least one cable segment on the second transmission medium comprise the co-cable segment by matching a distance between at least one first event in the first transmission medium and the reference event with a distance between at least one second event in the second transmission medium and the reference event.

7. The method according to claim 6, wherein the obtaining the probability that the at least one cable segment on the first transmission medium and the at least one cable segment on the second transmission medium comprise the co-cable segment by matching the distance between at least one first event in the first transmission medium and the reference event with the distance between at least one second event in the second transmission medium and the reference event comprises:

obtaining at least one event similarity by matching the distance between the at least one first event in the first transmission medium and the reference event with the distance between the at least one second event in the second transmission medium and the reference event; and calculating, based on the at least one event similarity, the probability that the at least one cable segment on the first transmission medium and the at least one cable segment on the second transmission medium comprise the co-cable segment.

8. A network device, comprising:

a processor; and a non-transitory computer readable medium having stored thereon a computer program for execution by the processor, the computer program including instructions for:

obtaining information about at least two first events and information about at least two second events, wherein the information about the at least two first events is obtained based on a first sounding signal transmitted in a first transmission medium, the information about the at least two second events is obtained based on a second sounding signal transmitted in a second transmission medium, the information about the at least two first events indicates at least one cable segment on the first transmission medium, and the information about the at least two second events indicates at least one cable segment on the second transmission medium; and obtaining, based on the information about the at least two first events and the information about the at least two second events, a probability that the at least one cable segment on the first transmission medium and the at least one cable segment on the second transmission medium comprise a co-cable segment, wherein the co-cable segment is a cable segment shared by the first transmission medium and the second transmission medium.

9. The network device according to claim 8, wherein the instructions for the obtaining the probability that the at least one cable segment on the first transmission medium and the at least one cable segment on the second transmission medium comprise the co-cable segment comprises:

determining a distance between two adjacent first events in the first transmission medium and a distance between two adjacent second events in the second transmission medium; and obtaining the probability that the at least one cable segment on the first transmission medium and the at least one cable segment on the second transmission medium comprise the co-cable segment by matching a distance between two adjacent first events in the first transmission medium with a distance between two adjacent second events in the second transmission medium.

10. The network device according to claim 9, wherein the at least two first events and the at least two second events comprise major events, and wherein the major events indicate that a confidence level of a cable segment is greater than or equal to a first preset threshold; and wherein the instructions for the obtaining the probability that the at least one cable segment on the first transmission medium and the at least one cable segment on the second transmission medium comprise the co-cable segment by matching the distance between two adjacent first events in the first transmission medium with the distance between two adjacent second events in the second transmission medium include instructions for:

obtaining a major-event similarity by matching a distance between two adjacent major events in the first transmission medium with a distance between two adjacent major events in the second transmission medium; and calculating, based on the major-event similarity, the probability that the at least one cable segment on the first transmission medium and the at least one cable segment on the second transmission medium comprise the co-cable segment.

11. The network device according to claim 9, wherein the at least two first events and the at least two second events comprise minor events, and wherein the minor events indicate that a confidence level of a cable segment is less than or equal to a second preset threshold; and wherein the instructions for obtaining the probability that the at least one cable segment on the first transmission medium and the at least one cable segment on the second transmission medium comprise the co-cable segment by matching the distance between two adjacent first events in the first transmission medium with the distance between two adjacent second events in the second transmission medium include instructions for:
  obtaining a minor-event similarity by matching a distance between two adjacent minor events in the first transmission medium with a distance between two adjacent minor events in the second transmission medium; and
  calculating, based on the minor-event similarity, the probability that the at least one cable segment on the first transmission medium and the at least one cable segment on the second transmission medium comprise the co-cable segment.

12. The network device according to claim 8, wherein the instructions for the obtaining the probability that the at least one cable segment on the first transmission medium and the at least one cable segment on the second transmission medium comprise the co-cable segment include instructions for:
  calculating, based on event types of the at least two first events and event types of the at least two second events, the probability that the at least one cable segment on the first transmission medium and the at least one cable segment on the second transmission medium comprise the co-cable segment.

13. The network device according to claim 8, wherein the at least two first events and the at least two second events comprise a reference event, and wherein the reference event is an event generated by the first sounding signal and the second sounding signal at a same cable location; and
  wherein the instructions for the obtaining the probability that the at least one cable segment on the first transmission medium and the at least one cable segment on the second transmission medium comprise the co-cable segment include instructions for:
    obtaining the probability that the at least one cable segment on the first transmission medium and the at least one cable segment on the second transmission medium comprise the co-cable segment by matching a distance between at least one first event in the first transmission medium and the reference event with a distance between at least one second event in the second transmission medium and the reference event.

14. The network device according to claim 13, wherein the instructions for obtaining the probability that the at least one cable segment on the first transmission medium and the at least one cable segment on the second transmission medium comprise the co-cable segment by matching the distance between at least one first event in the first transmission medium and the reference event with the distance between at least one second event in the second transmission medium and the reference event include instructions for:
  obtaining at least one event similarity by matching the distance between the at least one first event in the first transmission medium and the reference event with the distance between the at least one second event in the second transmission medium and the reference event; and
  calculating, based on the at least one event similarity, the probability that the at least one cable segment on the first transmission medium and the at least one cable segment on the second transmission medium comprise the co-cable segment.

15. A communication system, comprising:
  a network device; and
  at least one node, wherein data is transmitted between the at least one node through a connected transmission medium; and
  wherein the network device is configured to perform co-cable probability detection, the co-cable probability detection comprising:
    obtaining information about at least two first events and information about at least two second events, wherein the information about the at least two first events is obtained based on a first sounding signal transmitted in a first transmission medium, wherein the information about the at least two second events is obtained based on a second sounding signal transmitted in a second transmission medium, wherein the information about the at least two first events indicates at least one cable segment on the first transmission medium, and wherein the information about the at least two second events indicates at least one cable segment on the second transmission medium; and
    obtaining, based on the information about the at least two first events and the information about the at least two second events, wherein a probability that the at least one cable segment on the first transmission medium and the at least one cable segment on the second transmission medium comprise a co-cable segment, and wherein the co-cable segment is a cable segment shared by the first transmission medium and the second transmission medium.

16. The communication system according to claim 15, wherein the obtaining the probability that the at least one cable segment on the first transmission medium and the at least one cable segment on the second transmission medium comprise the co-cable segment comprises:
  determining a distance between two adjacent first events in the first transmission medium and a distance between two adjacent second events in the second transmission medium; and
  obtaining the probability that the at least one cable segment on the first transmission medium and the at least one cable segment on the second transmission medium comprise the co-cable segment by matching a distance between two adjacent first events in the first transmission medium with a distance between two adjacent second events in the second transmission medium.

17. The communication system according to claim 16, wherein the at least two first events and the at least two second events comprise major events, and wherein the major events indicate that a confidence level of a cable segment is greater than or equal to a first preset threshold; and
  wherein the obtaining the probability that the at least one cable segment on the first transmission medium and the at least one cable segment on the second transmission medium comprise the co-cable segment by matching the distance between two adjacent first events in the first transmission medium with the distance between two adjacent second events in the second transmission medium comprises:
    obtaining a major-event similarity by matching a distance between two adjacent major events in the first transmission medium with a distance between two adjacent major events in the second transmission medium; and
    calculating, based on the major-event similarity, the probability that the at least one cable segment on the first transmission medium and the at least one cable segment on the second transmission medium comprise the co-cable segment.

18. The communication system according to claim 16, wherein the at least two first events and the at least two second events comprise minor events, and wherein the minor events indicate that a confidence level of a cable segment is less than or equal to a second preset threshold; and wherein the obtaining the probability that the at least one cable segment on the first transmission medium and the at least one cable segment on the second transmission medium comprise the co-cable segment by matching the distance between two adjacent first events in the first transmission medium with the distance between two adjacent second events in the second transmission medium comprises:

obtaining a minor-event similarity by matching a distance between two adjacent minor events in the first transmission medium with a distance between two adjacent minor events in the second transmission medium; and calculating, based on the minor-event similarity, the probability that the at least one cable segment on the first transmission medium and the at least one cable segment on the second transmission medium comprise the co-cable segment.

19. The communication system according to claim 15, wherein the obtaining the probability that the at least one cable segment on the first transmission medium and the at least one cable segment on the second transmission medium comprise the co-cable segment comprises:

calculating, based on event types of the at least two first events and event types of the at least two second events, the probability that the at least one cable segment on the first transmission medium and the at least one cable segment on the second transmission medium comprise the co-cable segment.

20. The communication system according to claim 15, wherein the at least two first events and the at least two second events comprise a reference event, and wherein the reference event is an event generated by the first sounding signal and the second sounding signal at a same cable location; and wherein the obtaining the probability that the at least one cable segment on the first transmission medium and the at least one cable segment on the second transmission medium comprise the co-cable segment comprises:

obtaining the probability that the at least one cable segment on the first transmission medium and the at least one cable segment on the second transmission medium comprise the co-cable segment by matching a distance between at least one first event in the first transmission medium and the reference event with a distance between at least one second event in the second transmission medium and the reference event.

* * * * *